United States Patent
Wixted et al.

(10) Patent No.: US 11,238,542 B1
(45) Date of Patent: Feb. 1, 2022

(54) ONLINE INTERACTIVE NOTIFICATION PLATFORM FOR EXPLORING POSSIBLE TAX NEXUS AND IMPLICATIONS

(71) Applicant: Avalara, Inc., Seattle, WA (US)

(72) Inventors: Ellen Wixted, Bainbridge Island, WA (US); Andrew Jesse Powell, Seattle, WA (US); John Paul Catrett, Bainbridge Island, WA (US); Brock Rumer, Poulsbo, WA (US); Ben Fisher Johnson, Seattle, WA (US); Morgan Coleman, Bainbridge Island, WA (US); Salvador Anthony Rodriguez, Sacramento, CA (US); Tyler Flora, Houston, TX (US); Jeremy Martinez, Seattle, WA (US); Andrew Louis Bloom, Seattle, WA (US); Alexander Paul Demyanik, Seattle, WA (US); Allison M. Grampa, Seattle, WA (US)

(73) Assignee: Avalara, Inc., Seattle, WA (US)

( * ) Notice: Subject to any disclaimer, the term of this patent is extended or adjusted under 35 U.S.C. 154(b) by 84 days.

(21) Appl. No.: 16/775,771

(22) Filed: Jan. 29, 2020

(51) Int. Cl.
*G06Q 40/00* (2012.01)
*G06Q 30/00* (2012.01)
*G06Q 30/06* (2012.01)

(52) U.S. Cl.
CPC ......... *G06Q 40/123* (2013.12); *G06Q 30/018* (2013.01); *G06Q 30/0633* (2013.01)

(58) Field of Classification Search
CPC ............... G06Q 40/123; G06Q 30/018; G06Q 30/0633
See application file for complete search history.

(56) References Cited

U.S. PATENT DOCUMENTS

| 5,335,169 A | 8/1994 | Chong |
| 6,993,502 B1 | 1/2006 | Gryglewicz et al. |
| 7,257,553 B1 * | 8/2007 | Baker .................... G06Q 10/10 705/31 |

(Continued)

OTHER PUBLICATIONS

"Sales and Transactions Checker for Economic Nexus," TaxJar, Feb. 19, 2019, https://www.taxjar.com/sales-and-transactions-checker/, 8 pages.

(Continued)

*Primary Examiner* — Florian M Zeender
*Assistant Examiner* — Christopher R Buchanan
(74) *Attorney, Agent, or Firm* — Seed IP Law Group LLP

(57) ABSTRACT

In response to receiving a request from a querying entity, such as a seller of goods or services, embodiments of a service engine present to a client computing device of the querying entity a set of queries about goods or services sold by the querying entity and other characteristics of the business of the querying entity. The service engine may intelligently determine which queries to present based on responses to preceding queries. The service engine may then compare the entries in response to the queries against stored rules for a one or more of a plurality of tax jurisdictions, the stored rules being about establishing nexus for purposes of remitting transaction tax in the certain tax jurisdiction. The service engine may then determine information regarding potential lack of tax compliance of the querying entity based on the comparison, and notify accordingly.

15 Claims, 31 Drawing Sheets

(56) References Cited

U.S. PATENT DOCUMENTS

| | | | |
|---|---|---|---|
| 7,783,536 | B2 | 8/2010 | William et al. |
| 7,933,803 | B1 | 4/2011 | Nadler et al. |
| 8,099,342 | B1* | 1/2012 | Christian .............. G06Q 40/123 |
| | | | 705/31 |
| 8,386,344 | B2 | 2/2013 | Christian et al. |
| 8,620,578 | B1 | 12/2013 | Brown et al. |
| 8,725,407 | B2 | 5/2014 | Hurley et al. |
| 9,760,915 | B2 | 9/2017 | Pavlou et al. |
| 10,445,818 | B1 | 10/2019 | Chowdhary |
| 10,572,953 | B1* | 2/2020 | Char ................... G06Q 40/123 |
| 10,614,130 | B1* | 4/2020 | Pai ..................... G06F 16/9035 |
| 10,769,611 | B2 | 9/2020 | McNeel |
| 2002/0138765 | A1 | 9/2002 | Fishman et al. |
| 2003/0093320 | A1 | 5/2003 | Sullivan et al. |
| 2003/0101112 | A1* | 5/2003 | Gallagher .............. G06Q 30/04 |
| | | | 705/31 |
| 2003/0144931 | A1 | 7/2003 | Stokes et al. |
| 2006/0085275 | A1 | 4/2006 | Stokes et al. |
| 2007/0136158 | A1 | 6/2007 | Rawlings et al. |
| 2007/0136159 | A1 | 6/2007 | Rawlings et al. |
| 2007/0203718 | A1* | 8/2007 | Merrifield, Jr. ..... G06Q 10/0635 |
| | | | 705/317 |
| 2008/0154754 | A1 | 6/2008 | William et al. |
| 2013/0013471 | A1 | 1/2013 | Fishman |
| 2013/0290200 | A1 | 10/2013 | Singhal et al. |
| 2014/0172526 | A1* | 6/2014 | Arrocho ............. G06Q 30/0212 |
| | | | 705/14.14 |
| 2016/0140668 | A1* | 5/2016 | Maguire .............. G06Q 40/123 |
| | | | 705/31 |
| 2017/0140471 | A1* | 5/2017 | Hemberg ............ G06Q 40/123 |
| 2020/0356974 | A1 | 11/2020 | McNeel |
| 2021/0233181 | A1 | 7/2021 | Bubalo et al. |

OTHER PUBLICATIONS

"The Seller's Guide to eCommerce Sales Tax," TaxJar, Jun. 18, 2019, https://www.taxjar.com/guides/intro-to-sales-tax/, 19 pages.

Yetter, "Sales Tax Institute helps you understand sales and use tax obligations," YouTube Video, Dec. 15, 2011, URL=https://www.youtube.com/watch?v=gKFe1W062Ok&feature=emb_logo, download date Sep. 10, 2019, 1 page. (Screenshot).

"How do I know if I should be collecting tax in a state?" Sales Tax Institute, Aug. 12, 2017, https://www.salestaxinstitute.com/sales_tax_faqs/should_i_collect_tax, 2 pages.

"What is Nexus?" Sales Tax Institute, Aug. 26, 2019, https://www.salestaxinstitute.com/sales_tax_faqs/what_is_nexus, 6 pages.

"Sales Tax Nexus Guide," taxconnex, Whitepaper Download, 2019, 18 pages.

Therrien, Seth et al., "Tax Nexus Notification Platform," U.S. Appl. No. 16/585,829, filed Sep. 27, 2019, 72 pages.

Morgan, Amy et al., "Assembling Parameters To Compute Taxes for Cross-Border Sales," U.S. Appl. No. 16/696,062, filed Nov. 26, 2019, 75 Pages.

U.S. Appl. No. 6/585,829, filed Sep. 27, 2019, Tax Nexus Notification Platform.

U.S. Appl. No. 16/696,062, filed Nov. 26, 2019, Assembling Parameters to Compute Taxes for Cross-Border Sales.

Seth Therrien et al., "Tax Nexus Notification Platform," U.S. Appl. No. 16/585,829, filed Sep. 27, 2019, (72 pages).

Stefan Kim et al., "Disestablishing Entity's Selected Resource Computation in Response To Loss of Nexus Establishment Condition for Selected Domain," U.S. Appl. No. 16/834,934, filed Mar. 30, 2020, (63 pages).

Nikki Nash et al., "Automatically Starting Activities Upon Crossing Threshold," U.S. Appl. No. 17/338,220, filed Jun. 3, 2021, (107 pages).

* cited by examiner

1312

Do you collect sales tax from your customers today?

1314 ◉ Yes ○ No

Where are you currently registered to collect sales tax?

1316

1318 I collect tax in countries other than the United States and Canada

Back　　　　　　　　　　　　　　　　　　　Next

1352

1354 How do you ecommerce?

Where does your company have website servers that it owns?

1356 [ Alabama ] [ Alaska ] [ Arizona ] [ Arkansas ] [ California ] [ Colorado ] [ Connecticut ]
[ Delaware ] [ Florida ] [ Georgia ] [ Hawaii ] [ Idaho ] [ Illinois ] [ Indiana ] [ Iowa ] [ Kansas ]
[ Kentucky ] [ Louisiana ] [ Maine ] [ Maryland ] [ Massachusetts ] [ Michigan ] [ Minnesota ]
[ Mississippi ] [ Missouri ] [ Montana ] [ Nebraska ] [ Nevada ] [ New Hampshire ] [ New Jersey ]
[ New Mexico ] [ New York ] [ North Carolina ] [ North Dakota ] [ Ohio ] [ Oklahoma ]
[ South Dakota ] [ Oregon ] [ Pennsylvania ] [ Rhode Island ] [ South Carolina ] [ Tennessee ]
[ Texas ] [ Utah ] [ Vermont ] [ Virginia ] [ Washington ] [ West Virginia ] [ Wisconsin ] [ Wyoming ]

Back                                                                                                    Next

ONLINE INTERACTIVE NOTIFICATION PLATFORM FOR EXPLORING POSSIBLE TAX NEXUS AND IMPLICATIONS

BRIEF SUMMARY

A large amount of information may be needed from a given business to determine if and when it should remit transaction taxes in various different tax jurisdictions. This is due to the myriad of different rules and regulations for each individual jurisdiction regarding remitting transaction taxes, for example tax nexus rules. In particular, when businesses sell or buy goods, they are required by law to compute the amounts of money they may owe as taxes to various tax jurisdictions, and then remit these amounts to the tax jurisdictions. If they fail to accurately report and remit taxes, they may be subject to audits and fines—and ignorance of the law is not an excuse. Thus, it can be important for the operation of a system to have accurate and current information to determine in real time if and when businesses should remit transaction taxes in various different tax jurisdictions.

Businesses generally collect information relating to their operations, such as by using enterprise resource planning ("ERP") software applications and accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on. ERP applications, accounting applications, e-commerce applications and other conventionally used applications often fail to provide accurate, reliable per-jurisdiction tax compliance information in a timely and efficient manner according to the various different rules in various different tax jurisdictions, which is in part due to the vast amount of data regarding the business operations that may be needed for purposes of determining if and when the business should remit transaction taxes in various different tax jurisdictions.

However, depending on particular characteristics of the business, not all the same information, or same type of information, needs to be collected from each business for purposes of electronically determining if and when the business should remit transaction taxes in various different tax jurisdictions. For example, if some preliminary characteristics regarding the business are determined, then, based on those preliminary characteristics other categories of data may not need to be collected. Also, due to the sheer volume of accurate and current data of different types needed from businesses transmitted in an electronic format via ERP software applications and accounting applications which could only be understood and processed by computers, as well as the number of different changing rules and regulations for each individual jurisdiction, accurately determining at any given time, for all such vast numbers of businesses, if and when the businesses should remit transaction taxes in various different tax jurisdictions using such data feeds could not be performed by the human mind, even with pen and paper. Furthermore, due to the above considerations, accurately determining at any given time, for all such vast numbers of different businesses, which preliminary characteristics regarding each of the businesses that, if determined, would make it so other categories of data may not need to be collected to perform the electronic determinations regarding whether the businesses should remit transaction taxes in various different tax jurisdictions using such data feeds based on those preliminary characteristics, could not be performed by the human mind, even with pen and paper.

Thus, based on the above recognition herein that, depending on particular characteristics of the business, not all the same information, or same type of information, needs to be collected from each business for purposes of electronically determining, at any given time, whether vast numbers of different businesses should remit transaction taxes in various different tax jurisdictions, and solve the other technical problems above and described herein, disclosed herein is a method comprising receiving, by a computer system from a client computing device over a network, a request regarding transaction tax compliance of a querying entity; in response to receiving the request, presenting, by the computer system to the client computing device over the network, a set of queries about goods or services sold by the querying entity; receiving, by the computer system, entries for respective ones of the queries; comparing, by the computer system, the received entries against stored rules for a certain one of a plurality of tax jurisdictions, the stored rules being about establishing nexus for purposes of remitting transaction tax in the certain tax jurisdiction; determining, by the computer system, information regarding potential lack of tax compliance of the querying entity for the certain tax jurisdiction based on the comparison; and communicating, by the computer system to the client computing device over the network, the information regarding the potential lack of tax compliance.

Also, to solve the above technical problems, disclosed herein is a system comprising at least one processor and a memory coupled to the at least one processor. The memory stores instructions that, when executed by the at least one processor, cause the system to perform operations comprising receiving, from a client computing device over a network, a request regarding transaction tax compliance of a querying entity; in response to receiving the request, presenting, to the client computing device over the network, a set of queries about goods or services sold by the querying entity; receiving entries for respective ones of the queries; comparing the received entries against stored rules for a certain one of a plurality of tax jurisdictions, the stored rules being about establishing nexus for purposes of remitting transaction tax in the certain tax jurisdiction; determining information regarding potential lack of tax compliance of the querying entity for the certain tax jurisdiction based on the comparison; and communicating, to the client computing device over the network, the information regarding the potential lack of tax compliance.

Additionally, to solve the above technical problems, disclosed herein is a non-transitory computer-readable storage medium having computer-executable instructions stored thereon that, when executed by at least one processor, cause the at least one processor to perform operations comprising receiving, from a client computing device over a network, a request regarding transaction tax compliance of a querying entity; in response to receiving the request, presenting, to the client computing device over the network, a set of queries about goods or services sold by the querying entity; receiving entries for respective ones of the queries; comparing the received entries against stored rules for a certain one of a plurality of tax jurisdictions, the stored rules being about establishing nexus for purposes of remitting transaction tax in the certain tax jurisdiction; determining information regarding potential lack of tax compliance of the querying entity for the certain tax jurisdiction based on the comparison; and communicating, to the client computing device over the network, the information regarding the potential lack of tax compliance.

Embodiments may permit an entity to explore its potential exposure to tax risk, audits, liabilities, penalties and so on tentatively. An advantage is that such an entity may make the exploration tentatively, and without committing to becoming a customer of a host tax service. In fact, such an entity may even make this exploration anonymously, by tentatively giving false data about its identity.

Some embodiments consult stored rules and previously entered data, and ask of the exploring entity only questions that are relevant of each jurisdiction. An advantage can be that the exploring entity will reach workable answers with less effort than otherwise.

Some embodiments permit the exploring entity to give sales data only in aggregate form. In such embodiments, the aggregate sales data may be tentatively apportioned to different jurisdictions according to pre-stored population data. An advantage can be that the exploring entity may thus obtain multiple answers about tax risk in respective tax jurisdictions, without needing to identify and enter detailed sales data for each such jurisdiction.

Some embodiments further permit an entity that is merely exploring its tax risk exposure to register with the online service, become a customer of it, and so on. In some embodiments, the data entered by the exploring entity can be confirmed with just a few keystrokes as being the client data. Further embodiments may provide additional services to registered customers, such as assistance or direct registration with a tax authority, assistance in creating returns, assistance in filing or direct filing of a return, and assistance in remittance of taxes due.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 13H is an example portion of a user interface of a tax nexus online interactive notification platform prompting a querying entity with a query regarding where the querying entity has website servers that it owns, according to various embodiments of the present disclosure.

FIG. 13O is an example portion of a user interface of a tax nexus online interactive notification platform presenting a further report regarding potential tax liability of the querying entity for potential tax liability for previous years based on responses from the querying entity to prompts presenting queries for the querying entity, according to various embodiments of the present disclosure.

DETAILED DESCRIPTION

Figure 1:
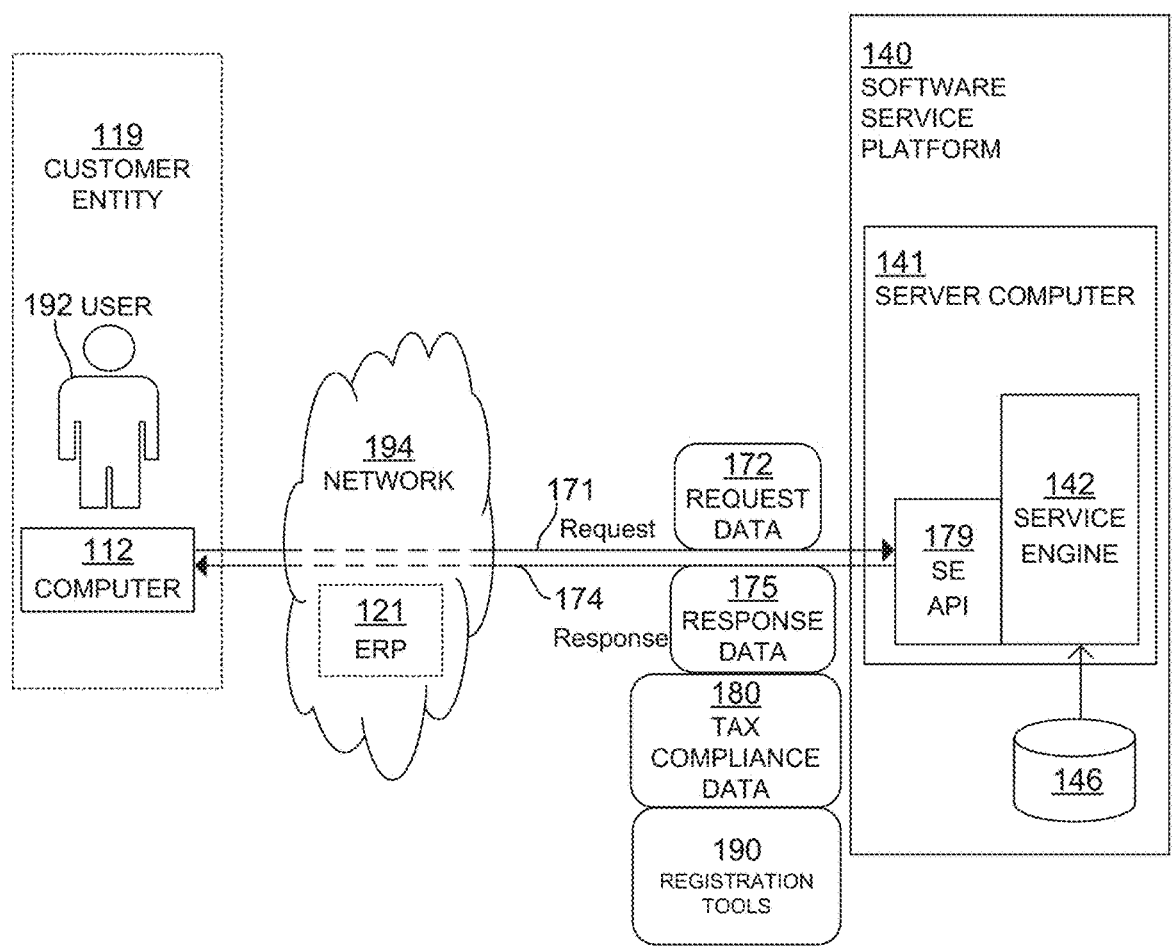
FIG. 1 is a block diagram showing an example configuration of a system, according to various embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

There are many types of taxes for businesses. Such taxes include sales tax, use tax, excise tax, value-added tax, industry-specific taxes, cross-border taxes, and so on (collectively referred to herein as "transaction taxes"). Further, for a single transaction, taxes may be due to more than one tax jurisdiction, such as different states, localities within the states, counties, cities, municipalities, etc.

Determining the taxes due is often very complex. There are over 10,000 tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location. Additional complexities arise from the fact that different tax jurisdictions charge different percentage rates. These different tax jurisdictions can be different states, counties, cities, municipalities, special taxing jurisdictions, and so on.

In addition to calculating the cost of the tax, sellers of goods and services are subjected to many requirements about the taxes they must collect and remit. In particular, a seller must determine whether, and when, they must collect and remit transaction taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state. In the U.S., retailers must have some kind of presence in a state before that state can require that retailer to collect and remit sales tax from buyers in that state. With the Supreme Court ruling in the *South Dakota* v. *Wayfair* case, not only does physical presence (such as a location, employee or inventory), but "economic" presence in a state may create sales tax nexus, i.e. establish nexus for purposes of paying sales tax. In other words, due to the Wayfair ruling, even if a retailer does not have a physical presence in a state, if the retailer passes a state's economic threshold, for example, for total revenue or number of transactions in that state, the retailer is legally obligated to collect and remit sales tax to that state. However, different states have different thresholds for determining whether there is an economic nexus, which provides a problem for retailers in determining whether they are compliant with the tax rules in various jurisdictions, especially when the retailers have ever changing total revenue and numbers of transactions in various different jurisdictions.

Embodiments may help a retailer who may wonder whether they have recently been exposed to tax risk, for example by starting to sell online. In particular, embodiments may help determine tax compliance under such circumstances in various different jurisdictions according to the various different rules for the different tax jurisdictions over computer networks.

In addition, embodiments may, depending on particular characteristics of a querying business, determine the type of information needed, and avoid asking for extraneous information that need not be collected, for purposes of electronically determining if and when the business should remit transaction taxes in various different tax jurisdictions. In particular, the present disclosure provides systems and methods that solve this and such other technical problems by increasing the speed, efficiency and accuracy of such specialized software platforms and computer networks.

A distinction should be drawn between a user exploring their potential liability without being a customer of an online service, and a user who is a customer of such a service. While someone exploring may enter approximate data tentatively, a customer expecting accurate answers should of course enter accurate data. Embodiments of a customer being notified when their data indicates that they are reaching nexus with a tax jurisdiction are described in U.S. patent application Ser. No. 16/585,829 filed Sep. 27, 2019, and which is hereby incorporated by reference in its entirety. Moreover, other than some answers, someone who merely explores may not realistically expect further services with respect to a tax authority. A customer, however, may authorize the service to interact with a tax authority on its behalf, such as to initiate registration, file returns and even remit tax payments.

FIG. 1 is a block diagram showing an example configuration of a system 100 working with a new service engine 142 that generates tax compliance data 180, and generates and implements registration tools 190, according to various embodiments of the present disclosure.

A sample customer entity 119 includes a computer 112, and a user 192 who may use computer 112. Both could be located within a physical site of the customer entity 119, but that is not necessary. More details about computer 112 are provided with reference to FIG. 2.

In this example, a network 194 is a communications network. Network 194 can be any type of network, such as a local area network (LAN), a metropolitan area network (MAN), a wide area network (WAN), or the internet. In some embodiments, network 194 is considered to be the cloud. An Enterprise Resource Planning (ERP) system 121 may also be within network 194, if it is the cloud, or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example, in a peer-to-peer configuration, with the operations of the service distributed among them. The server computers can be located at a single geographic location or be distributed across multiple locations. Similarly, additional databases may be used for the service, and so on.

Server computer 141 is configured, by software, to implement a service engine 142. Service engine 142 is configured to perform a predefined service. The service can be a computation, a search, a verification, a registration, a payment, a notification, generation and/or presentation of a set of queries about goods or services sold, generation of other specialized information and so on. According to various embodiments of the present disclosure, the service may be receiving a request regarding transaction tax compliance of a querying entity (e.g., the customer entity 119) and, in response to receiving the request, presenting (e.g., to the computer 112 and/or user 192) a set of queries about goods or services sold by the querying entity. The service may receive entries for respective ones of the queries and compare the received entries against stored rules for a certain one of a plurality of tax jurisdictions, the stored rules being about establishing nexus for purposes of remitting transaction tax in the certain tax jurisdiction.

According to various embodiments of the present disclosure, the service may be determining or generating, based on the comparison of the received entries against the stored rules, information about potential lack of tax compliance of customer entity 119 in various jurisdictions based on rules about establishing nexus for purposes of remitting transaction tax in the jurisdictions and/or communicating to the computer 112 over the network 194, the information regarding the potential lack of tax compliance. In some embodiments, the transmission of such information may alert the customer entity 119 of the potential lack of tax compliance. The tax compliance data 180 may be or include such information about potential lack of tax compliance.

In the context of FIG. 1, user 192 desires the service, and may even pay for it. User 192 uses computer 112 to access network 194 and, from network 194, to access software service platform 140. It will be appreciated that, in some contexts, service engine 142 performs cloud computing and is provided as software as a service (SaaS). Moreover, computer 112 can be viewed as a client computer from the perspective of software service platform 140.

The service of service engine 142 can be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service, such as presenting a set of queries about goods or services sold by the querying entity periodically and/or in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119.

SE API 179 is configured to receive a request 171, which is shown as an arrow. Request 171 may be transmitted via network 194. Request 171 may have been ultimately caused to be generated by computer 112, for example, as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may be regarding transaction tax compliance of a querying entity (e.g., customer entity 119). The request 171 may also include associated request data 172. When SE API 179 receives request 171, it invokes service engine 142. When thus invoked, service engine 142 may perform its service, which may include using request data 172. In response, SE API 179 can be configured to transmit a response 174, also shown as an arrow. Response 174 may include response data 175 that arises out of the service, such as a set of queries about goods or services sold by the querying entity, a computed result, a confirmation, and so on. Response 174 can be transmitted back to the sender of request 171, or as otherwise directed. In some embodiments, the request 171 may be automatically generated and transmitted, such as by the ERP system 121 and/or computer 112 in response to one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119.

In response to entries received for respective ones of the queries the service engine 142 may compare the received entries against stored rules for a certain one of a plurality of tax jurisdictions, the stored rules being about establishing nexus for purposes of remitting transaction tax in the certain tax jurisdiction. The service engine 142 may determine information regarding potential lack of tax compliance of the querying entity for the certain tax jurisdiction based on the comparison. The service engine 142 may generate and/or transmit tax compliance data 180 including the information regarding potential lack of tax compliance of the querying entity for the certain tax jurisdiction based on the comparison. For example, tax compliance data 180 may be or include information about potential lack of tax compliance of customer entity 119 in various jurisdictions based on rules about establishing nexus for purposes of remitting transaction tax in the jurisdictions and/or a notification about the generation of the information. In an example embodiment, the tax compliance data 180 may be or include an alert or other notification that alerts the customer entity 119 entity of the potential lack of tax compliance. In some embodiments, the tax compliance data 180 may be used to update information regarding the potential lack of tax compliance for a certain tax jurisdiction within an account associated with the customer entity 119. The account associated with the customer entity 119 may be accessible by the customer entity 119 via a client computing device, for example, the computer 112, in which the updated information regarding the potential lack of tax compliance is for display on a user interface associated with the account. Such a user interface may, in various embodiments, be a user interface of the server computer 141, computer 112, and/or a computer in ERP system 121, and so on. Furthermore, the account associated with the customer entity 119 may be managed, stored and/or accessible by the server computer 141, computer 112, and/or a computer in ERP system 121, and so on.

In some embodiments, the service engine 142 may, based on the determination that there is a potential lack of tax compliance of the querying entity for various tax jurisdictions, generate registration tools 190. For example, the registration tools 190 may cause, for each of the various tax jurisdictions, an interactive user interface element to be presented on a display of the client computing device (e.g., computer 112) that, once selected, may automatically initiate a process of registering the querying entity in the tax jurisdiction for purposes of remitting transaction taxes in the tax jurisdiction.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided near the end of this description, in order to not interrupt the flow of this description at this stage.

Figure 2:
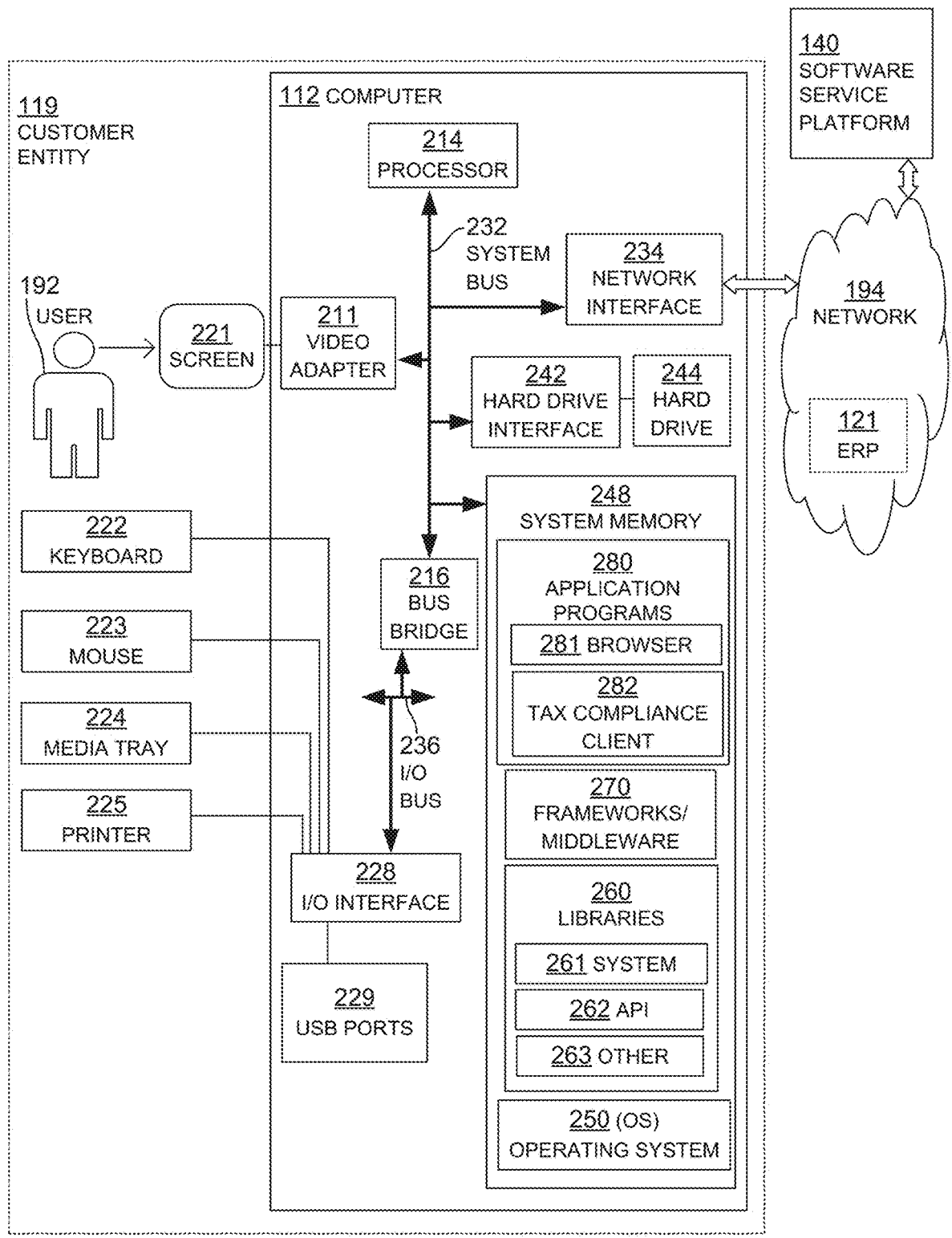
FIG. 2 is a block diagram showing more details of a computer of an example customer entity of FIG. 1, with reference to the communication network and the software service platform, according to various embodiments of the present disclosure.

FIG. 2 is a block diagram showing more details of a computer 112 of an example customer entity 119 of FIG. 1, with reference to the communication network 194 and the software service platform 140, according to various embodiments of the present disclosure.

FIG. 2 shows customer entity 119 of FIG. 1, along with more sample details for computer 112. Computer 112 may be a desktop computer, a laptop computer, a tablet computer, a mobile phone, and so on.

Computer 112 includes a processor 214. Computer 112 also includes a system bus 232 that is coupled to processor 214. System bus 232 can be used by processor 214 to control and/or communicate with other components of computer 112.

Computer 112 additionally includes a network interface 234 that is coupled to system bus 232. Network interface 234 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 234 can access network 194.

Also shown is a tax compliance client 282 residing in system memory 248, which may comprise computer-executable instructions executed by processor 214 to invoke or otherwise obtain services of the software service platform 140 provided by the service engine 142 running on server computer 141 of the software service platform 140. For example, the tax compliance client 282 may obtain and/or invoke the software service platform 140 to generate and/or transmit tax compliance data 180. For example, the tax compliance client 282 may send a request to the software service platform 140 regarding transaction tax compliance of the customer entity 119 and, in response, may be presented with a set of queries about goods or services sold by the querying entity. The tax compliance client 282 may then provide entries for respective ones of the queries. For example, such entries may be collected by the tax compliance client 282 from the user 192 via a user interface with the received queries presented on the screen 221.

In some embodiments, the tax compliance client 282 may generate a user interface for and/or provide access to an account associated with the customer entity 119 through which the tax compliance data 180 for the customer entity 119 may be accessible by the customer entity 119 via the computer 112. For example, the queries and/or updated information regarding the potential lack of tax compliance of the customer entity 119 may be displayed via the tax compliance client 282 on a user interface associated with the account and/or the tax compliance client 282. The tax compliance client 282 may, in various embodiments, be part of or integrated with the browser 281. In other embodiments, the browser 281 may be or perform the operations of the tax compliance client 282, for example, when the software service platform 140 provides web-based services.

In some embodiments, the tax compliance client 282 may communicate and/or obtain services of ERP applications (e.g., ERP system 121), accounting applications, e-commerce applications and/or other applications remote from or resident on the computer 112. For example, the tax compliance client 282 may cause ERP system 121 to transmit a request or other information to the software service platform 140 that invokes services of the software service platform 140 to be provided to the tax compliance client 282 and/or ERP system 121. For example, such information may include a request regarding transaction tax compliance of the customer entity 119, entries for respective ones of the queries, entity information indicative of one or more various conditions being satisfied, including, but not limited to, one or more of: a detected change or update to stored rules about establishing nexus for purposes of remitting transaction tax in a certain tax jurisdiction; a detected change or update to a monetary amount of sales of the customer entity 119 that are associated with a certain tax jurisdiction; a detected change or update to a volume of sales transactions of the customer entity 119 that are associated with a certain tax jurisdiction; one or more thresholds being met, within a predetermined threshold of being met, or being exceeded regarding sales associated with establishing nexus for purposes of remitting transaction tax in a certain tax jurisdiction; and conditions indicated by stored preferences of customer entity 119. As another example, the tax compliance client 282 may request, or cause ERP system 121 to request, transaction data regarding sales of the customer entity 119 from the ERP system 121, accounting applications, e-commerce applications and/or other applications for purposes of providing the entries for respective ones of the queries, and/or transmitting such transaction data to the software service platform 140 in response to the queries, such that the software service platform 140 can use such data to determine potential lack of tax compliance in various jurisdictions for the customer entity 119. In yet other embodiments, ERP system 121 originates transmitting a request or transmitting of other information on behalf of customer entity 119.

Additional details about FIG. 2 are provided near the end of this description, in order to not interrupt the flow of this description at this stage.

Figure 3:
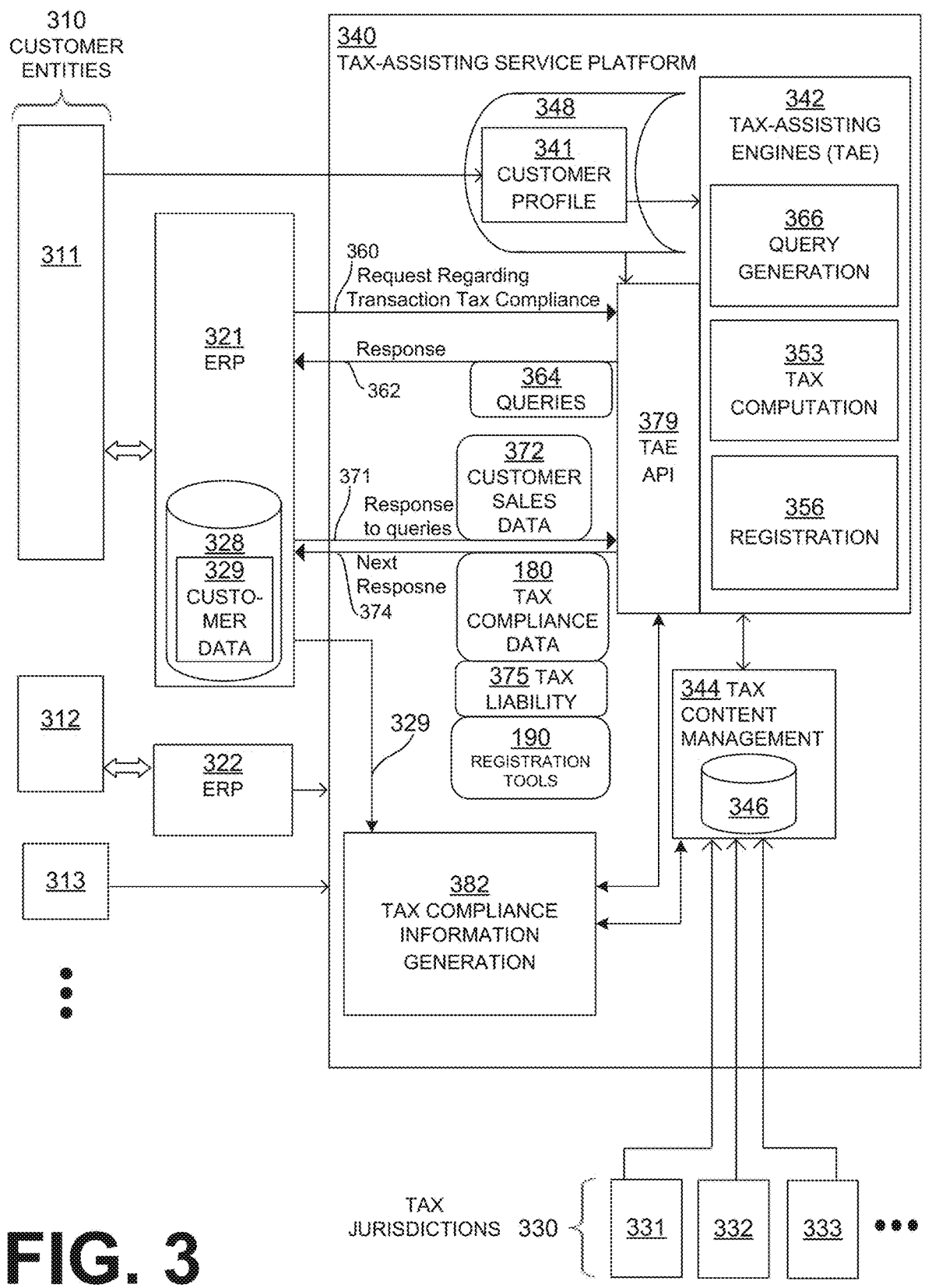
FIG. 3 is a block diagram showing an example software architecture with a tax-assisting engine having a query generation engine working with a tax compliance information generation engine, according to various embodiments of the present disclosure.

FIG. 3 is a block diagram showing an example software architecture with a tax-assisting engine 342 having a query generation engine 366 working with a tax compliance information generation engine 382, according to various embodiments of the present disclosure.

In this example, a software-implemented tax-assisting service platform 340 is configured to provide tax-related services. These services may include generation and/or presentation of a set of queries about goods or services sold, generation of other specialized information and so on. According to various embodiments of the present disclosure, the services may include receiving a request regarding transaction tax compliance of one or more querying entities (e.g., the customer entities 310) and, in response to receiving the request, presenting (e.g., to the customer entities 310) a set of queries about goods or services sold by the particular querying entity. The service may include receiving entries for respective ones of the queries and comparing the received entries against stored rules for a certain one of a plurality of tax jurisdictions, the stored rules being about establishing nexus for purposes of remitting transaction tax in the certain tax jurisdiction. According to various embodiments of the present disclosure, the service may include determining or generating, based on the comparison of the received entries against the stored rules, information about potential lack of tax compliance of one or more of customer entities 310 in various jurisdictions based on rules about establishing nexus for purposes of remitting transaction tax in the jurisdictions and/or communicating to the respective customer entities 310 the information regarding the potential lack of tax compliance. The service may include determining potential lack of tax compliance in various different jurisdictions for the customer entities 310, generating information regarding potential lack of tax compliance of the entity for the various tax jurisdictions, and/or transmitting one or more notifications about the generation of the information. For example, such a notification may be a notification to a particular customer entity 311 that there is a potential lack of tax compliance of that customer entity 311 in a certain tax jurisdiction. In some embodiments, these services may also include performing tax calculations and, based on the determination that there is a potential lack of tax compliance of the querying entity for various tax jurisdictions, generating registration tools 190. For example, the registration tools 190 may cause, for each of the various tax jurisdictions, an interactive user interface element to be presented to one or more of the customer entities 310 that, once selected, automatically initiates a process of registering the querying customer entity in the tax jurisdiction for purposes of remitting transaction taxes in the tax jurisdiction. These customer entities 310 may access a software-implemented tax-assisting service platform 340, for receiving its tax-related services.

Aspects of FIG. 3 may be implemented by components described and shown elsewhere in this document, for example, with reference to FIG. 1 and FIG. 2. For instance, in some embodiments, customer entities 310 access tax-assisting service platform 340 fully directly, for example, as is shown for customer entity 313. In other embodiments, this accessing is performed at least in part indirectly, for example, by using Enterprise Resource Planning (ERP) system 321 from example customer entity 311 and ERP system 322 from example customer entity 312. In this example, ERP system 321 has a database 328 that stores customer data 329 of customer entity 311, such as sales data or other transaction data. For example, such sales data may be used by the tax compliance information generation engine 382 to determine potential lack of tax compliance in various tax jurisdictions 330 for the customer entities 310. In this example, tax-assisting service platform 340 includes a database 348, and customer entity 311 has stored their own customer profile 341 in database 348.

Tax-assisting service platform 340 includes a tax content management component 344 for use by TAE 342 and the tax compliance information generation engine 382. Tax content management component 344 may receive tax information from one or more tax jurisdictions 330, such as sample tax jurisdictions 331, 332, 333, . . . . Tax content management component 344 includes a database 346 for storing the received tax information in the form of tax rules, rates, exemptions, etc. For example, the database 346 may store rules about establishing nexus for purposes of remitting transaction tax in the various tax jurisdictions 330. In some embodiments, such rules are rules about meeting or exceeding one or more thresholds regarding sales over a period of time.

Tax-assisting service platform 340 includes tax-assisting engines (TAE) 342. In some embodiments, TAE 342 includes a query generation engine 366, a tax computation engine 353 and a registration engine 356.

In this example, tax-assisting engines 342 may be invoked via a TAE Application Programming Interface (API) 379. Only one TAE API 379 is shown implemented here, while multiple ones may be implemented instead, for example, one for invoking each of query generation engine 366, tax computation engine 353 and registration engine 356. In this example, TAE API 379 is configured to receive a request regarding transaction tax compliance 360 of a querying entity (e.g., one or more of customer entities 311) and, in response to receiving the request 360, TAE API 379 invokes the query generation engine 366 of one of tax-assisting engines 342 to generate a set of queries about goods or services sold by the querying entity, such as to determine, by the TAE 342, information regarding potential lack of tax compliance of the querying entity for the certain tax jurisdiction based on the entries received in response to the set of queries. Then, TAE API 379 is configured to transmit a response 362 including the set of queries 364 from the query generation engine 366. In some embodiments, the set of queries includes one or more queries regarding goods or services sold by the querying entity (e.g., customer entity 311) over an indicated time period and/or other characteristics regarding the business of the querying entity.

The ERP 321 may then present to the querying entity (e.g., customer entity 311) the set of queries 364 about goods or services sold by the querying entity. In response to the set of queries 364, the TAE API 379 may receive a response to the queries 371 including customer sales data 372 in the form of entries for respective ones of the queries and communicate such entries to the TAE 342, which may then communicate such entries to the tax compliance information generation engine 382. The response to the queries 371 has data 372 of customer entity 311. Data 372 may be looked up from customer data 329 in database 328. The tax compliance information generation engine 382 then compares the received entries against stored rules for a certain one of a plurality of tax jurisdictions, the stored rules being about establishing nexus for purposes of remitting transaction tax in the certain tax jurisdiction. For example, such stored rules, including the thresholds, may be stored in the database 346 of the tax content management component 344 and accessible by the tax compliance information generation engine 382. Also, records of the sales transactions for the customer entities 310 may comprise and/or be part of the customer data 329 and transmitted to the tax compliance information generation engine 382, for example, in response to the set of queries 364. The stored preferences of one or more of the customer entities 310 may also comprise and/or be part of the customer data 329 and transmitted to the tax compliance information generation engine 382. The tax compliance information generation engine 382 may determine information regarding potential lack of tax compliance of the querying entity for the certain tax jurisdiction based on the comparison. Also, the tax compliance information generation engine 382 may compare the received entries against stored rules for each tax jurisdiction of the plurality of tax jurisdictions stored in the database 346 of the tax content management component 344, the stored rules for each tax jurisdiction being about establishing nexus for purposes of remitting transaction tax in each tax jurisdiction of the plurality of tax jurisdictions. The tax compliance information generation engine 382 may then also determine information regarding potential lack of tax compliance of the querying entity for each tax jurisdiction based on the comparison of the received entries against the stored rules for each tax jurisdiction.

In various example embodiments, the stored rules for the tax jurisdiction are rules about meeting or exceeding one or more thresholds regarding sales over a period of time and the received entries include information indicative of monetary sales amounts of the querying entity applicable to the period of time. The tax compliance information generation engine 382 then compares the information indicative of monetary sales amounts of the querying entity to the one or more thresholds regarding sales. The comparing of the received entries against the stored rules for the additional tax jurisdiction may include comparing the information indicative of the number of transactions of the querying entity to the one or more thresholds regarding a number of transactions over the period of time.

In response to receiving the response to the queries 371 including customer sales data 372 in the form of entries for respective ones of the queries, the tax compliance information generation engine 382 may generate and/or transmit tax compliance data 180 based on received customer sales data 372 and/or customer data 329. For example, tax compliance data 180 may be or include information about potential lack of tax compliance of one or more querying entities (e.g., one or more customer entities 310) in various jurisdictions 330 based on rules about establishing nexus for purposes of remitting transaction tax in the jurisdictions. Also, tax compliance data 180 may be or include a notification about the generation of the information. In an example embodiment, the tax compliance data 180 may be or include an alert or other notification that alerts one or more of the customer entities 310 of the potential lack of tax compliance in one or more of the tax jurisdictions 330. For example, such tax compliance data 180 may be communicated from the tax compliance information generation engine 382 to customer entity 311 via the TAE API 379 as part of or comprising the next response 374, which may be sent in response to receiving the response to the queries 371. However, in other various embodiments, the tax compliance data 180 may be communicated from the tax compliance information generation engine 382 to the customer entities directly and/or via other services.

The TAE 342, based on the determination that there is a potential lack of tax compliance of the querying entity, may cause the registration tool generation engine 356 to generate an interactive user interface element, and/or instructions for presenting such an interactive user interface element, to be presented on a display of the querying entity (e.g., customer entity 311) that, once selected, automatically initiates a process of registering the querying entity in the certain tax jurisdiction for purposes of remitting transaction taxes in the certain tax jurisdiction. Such an interactive user interface element, and/or instructions for presenting such an interactive user interface element, may be included as part of the registration tools 190 communicated in the next response 374, which may be sent in response to receiving the response to the queries 371. Additionally, the tax-assisting platform 340 may receive information indicative of the selection of the interactive user interface element (e.g., via the TAE API 379) and then complete the process of registering the querying entity in the certain tax jurisdiction for purposes of remitting transaction taxes in the certain tax jurisdiction based on the information indicative of the selection of the interactive user interface element. For example, such registration may be initiated and/or performed automatically by the registration engine 356.

Also, additional different queries may be generated by the query generation engine 366 based on entries received in response to the set of queries 364 which may be directed to collect preliminary characteristics regarding the business of the querying entity, such that a customized set of queries is presented to the querying entity based on the specific circumstances of the particular querying entity. In particular, if some preliminary characteristics regarding the business of the querying entity are first determined, then, based on those preliminary characteristics other categories of data may not need to be collected by the tax-assisting service platform in order to determine whether the querying entity should remit transaction taxes in various tax jurisdictions. Thus, electronically implementing collecting such preliminary characteristics over computer networks and specialized software platforms, such as the tax-assisting service platform 340, and then proceeding to reduce the amount of information that needs to be collected based on such preliminary characteristics of the business, in the particular manner as described herein, reduces amount of data that needs to be collected in electronically determining whether different businesses should remit transaction taxes in various different tax jurisdictions, and thus increases the efficiency of electronically determining, at any given time, whether vast numbers of different businesses should remit transaction taxes in various different tax jurisdictions.

In some embodiments, the queries 364 may also or instead be pushed to one or more of the customer entities 310 from the TAE 342 from and/or ERP system 321, such as in response to the customer sales data 372 and/or customer data 329 being updated or changed, or on a periodic basis. In response to receiving this information, the query generation engine 366 may send the queries 364. In various embodiments, the query generation engine 366 may also or instead automatically invoke itself to send the queries 364 in response to one or more various conditions being satisfied, including, but not limited to, one or more of: a detected change or update to stored rules about establishing nexus for purposes of remitting transaction tax in a certain tax jurisdiction of tax jurisdictions 330; a detected change or update to a monetary amount of sales, that are associated with a certain tax jurisdiction of tax jurisdictions 330, of one or more of the customer entities 310; a detected change or update to a volume of sales transactions, that are associated with a certain tax jurisdiction of tax jurisdictions 330, of one or more of the customer entities 310; one or more thresholds being met, within a predetermined threshold of being met, or being exceeded regarding sales associated with establishing nexus for purposes of one or more of the customer entities 310 remitting transaction tax in a certain tax jurisdiction of tax jurisdictions 330; and conditions indicated by stored preferences of one or more of the customer entities 310. For example, such stored rules, including the thresholds, may be stored in the database 346 of the tax content management component 344 and accessible by the tax compliance information generation engine 382. Also, records of the sales transactions for the customer entities 310 may comprise and/or be part of the customer data 329 and transmitted to the tax compliance information generation engine 382, which may then communicate the customer data 329 to the query generation engine 366. The stored preferences of one or more of the customer entities 310 may also comprise and/or be part of the customer data 329 and transmitted to the tax compliance information generation engine 382 and/or the query generation engine 366.

In some embodiments, the customer sales data 372 and/or customer data 329 may be automatically generated and/or transmitted to the query generation engine 366 and/or tax compliance information generation engine 382, such as by the ERP system 321 and/or one or more of the customer entities 310 in response to one or more various conditions being satisfied, including, but not limited to, one or more of: a detected change or update to stored rules about establishing nexus for purposes of remitting transaction tax in a certain tax jurisdiction of tax jurisdictions 330; a detected change or update to a monetary amount of sales, that are associated with a certain tax jurisdiction of tax jurisdictions 330, of one or more of the customer entities 310; a detected change or update to a volume of sales transactions, that are associated with a certain tax jurisdiction of tax jurisdictions 330, of one or more of the customer entities 310; one or more thresholds being met, within a predetermined threshold of being met, or being exceeded regarding sales associated with establishing nexus for purposes of one or more of the customer entities 310 remitting transaction tax in a certain tax jurisdiction of tax jurisdictions 330; and conditions indicated by stored preferences of one or more of the customer entities 310.

In response to such customer sales data 372 and/or customer data 329 being automatically generated and/or transmitted to the query generation engine 366, or in response to the query generation engine 366 invoking itself when certain conditions are satisfied, the query generation engine 366 may generate and/or transmit queries 364 based on received customer sales data 372 and/or customer data 329 and the tax compliance information generation engine 382 will then generate tax compliance data 180 in response to and based on the response to the queries 371. For example, tax compliance data 180 may be or include information about potential lack of tax compliance of one or more customer entities 310 in various jurisdictions 330 based on rules about establishing nexus for purposes of remitting transaction tax in the jurisdictions. Also, tax compliance data 180 may be or include a notification about the generation of the information. In an example embodiment, the tax compliance data 180 may be or include an alert or other notification that alerts one or more of the customer entities 310 of the potential lack of tax compliance in one or more of the tax jurisdictions 330. For example, as part of the response to the queries 371, the tax compliance information generation engine 382 may receive, via the TAE API 379, customer sales data 372 regarding sales of customer entity 311 in one or more of tax jurisdictions 330. The tax compliance information generation engine 382 may then compare the customer sales data 372 against rules stored in database 346 which are about establishing nexus for purposes of remitting transaction tax in each of the tax jurisdictions 330. If, for example, based on the customer sales data 372, the tax compliance information generation engine 382 determines that the volume of sales transactions of customer entity 311 meet, are within a predetermined threshold of meeting, or exceed a threshold indicated by the rules regarding establishing an economic nexus for tax jurisdiction 331, then the tax compliance information generation engine 382 may transmit a notification to customer entity 311 that there is a potential lack of tax compliance for customer entity 311 in tax jurisdiction 331. This notification may be, or be part of the tax compliance data 180.

In some embodiments, the tax compliance data 180 may be used to update information regarding the potential lack of tax compliance for one or more of the tax jurisdictions 330 within an account associated with the one or more customer entities 310. For example, an account associated with the customer entity 311 may be associated with or include customer profile 341 and accessible by the customer entity 311 via the tax-assisting service platform 340, in which the updated information regarding the potential lack of tax compliance is for display on a user interface associated with the account. Furthermore, the account associated with the customer entity 311 may be managed, stored and/or accessible by the customer entity 311, the tax-assisting service platform 340, and/or the ERP system 321.

If tax computation engine 353 is invoked by the response to queries 371, it may calculate a tax liability of an amount of tax due, based on data 372. In that case, the next response 374 includes a component of a tax liability 375 that indicates the calculated amount.

In some embodiments, tax-assisting service platform 340 may perform a variety of services in addition to what is described above. For one example, tax-assisting service platform 340 may accumulate and store customer sales data 372.

In another example, tax-assisting engines 342 and/or the tax compliance information generation engine 382 may further include one or more additional engines and/or functional components than are shown in the example of FIG. 3. Such additional engines and/or functional components, upon being invoked, can perform additional tax-related services, such as a) generate tax returns, i.e., prepare forms for filing by customer entities 310, b) file electronically such returns with the appropriate ones of tax jurisdiction(s) 330, and so on. In some embodiments, one or more of such services may be performed by the TAE 342 and/or the tax compliance information generation engine 382 for one or more of the customer entities 310, or a notification may be transmitted to one or more of the customer entities 310 that such services are available or recommended, in response to a determination by the tax compliance information generation engine 382 that there exists a potential lack of tax compliance for the one or more of the customer entities 310 based on the response to queries 371.

Figure 4:
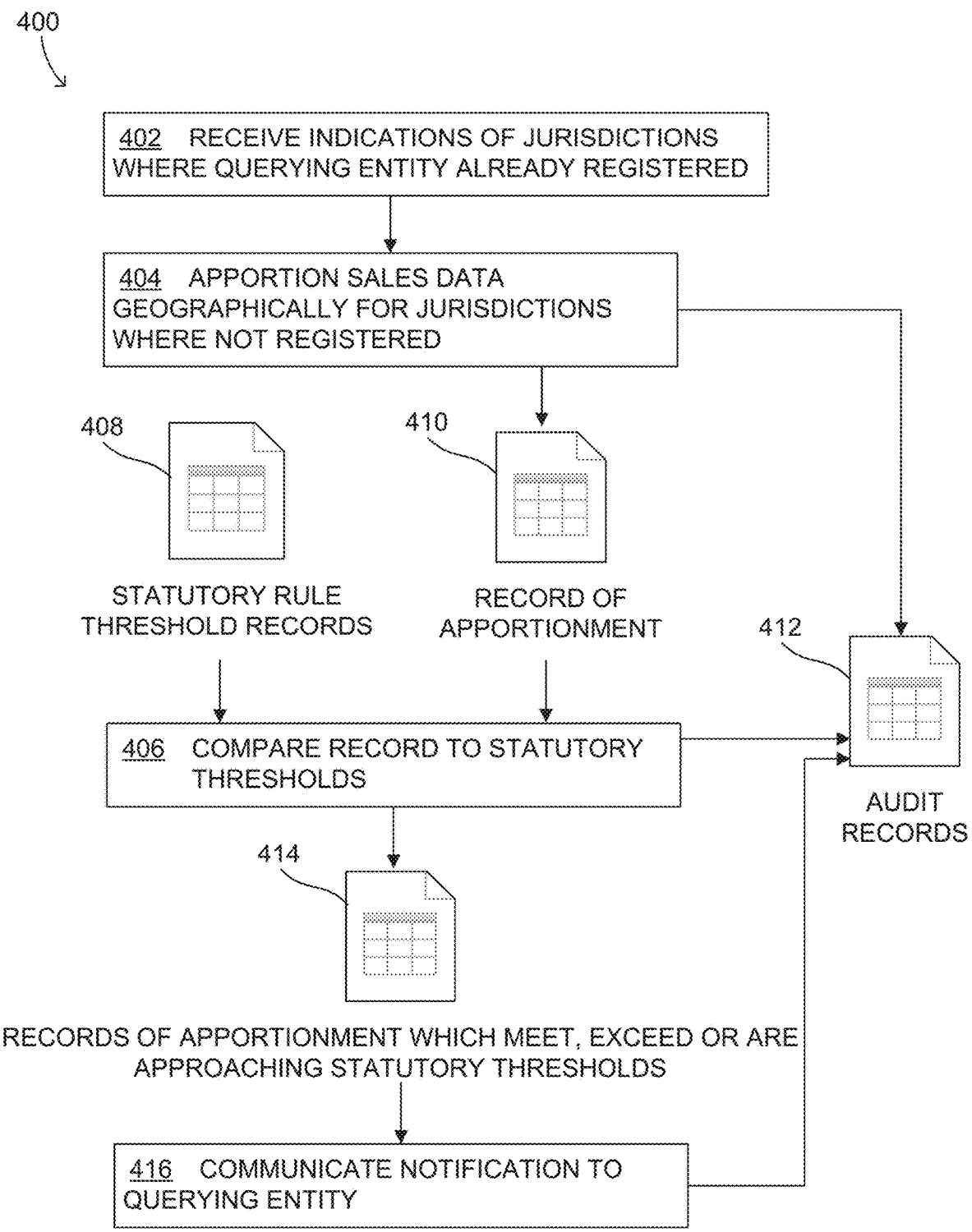
FIG. 4 is a flow diagram of an example process and corresponding data flow for communicating notifications to a querying entity about information regarding potential lack of tax compliance, according to various embodiments of the present disclosure.

FIG. 4 is a flow diagram of an example process 400 and corresponding data flow for communicating notifications to a querying entity about information regarding potential lack of tax compliance, according to various embodiments of the present disclosure.

At 402, the tax-assisting service platform 340 receives information indicative of one or more tax jurisdictions in which the querying entity had already registered for remitting transaction taxes. For example, such tax jurisdictions may include one or more of the tax jurisdictions 330 of FIG. 3.

At 404, the tax-assisting service platform 340, for each tax jurisdiction of the plurality of tax jurisdictions that is not the one or more tax jurisdictions in which the querying entity had already registered, may apportion to the tax jurisdiction one or more of: an apportioned number of transactions and an apportioned monetary sales amount, according to at least one criterion. Some or all of the information regarding a number of transactions and/or monetary sales may be obtained from or included as part of the customer sales data 372 and/or customer data 329. The criterion, for example, may include criterion regarding relative populations among the plurality of tax jurisdictions, and/or criterion regarding economic statistics about the plurality of tax jurisdictions. For example, jurisdictions with larger populations and/or larger economies indicated by the economic statistics may receive a proportionally larger apportioned number of transactions and/or a proportionally larger apportioned monetary sales amount. The tax-assisting service platform 340 may generate a record of the apportionment 410 indicating, for each tax jurisdiction of the plurality of tax jurisdictions that is not the one or more tax jurisdictions in which the querying entity had already registered, the apportioned number of transactions and/or the apportioned monetary sales amount for that jurisdiction. Such data may be organized by total revenue and/or total transactions geographically per jurisdiction and per customer entity. Such data may also be organized according to other criteria, including, but not limited to: type of goods, products or services sold; exempt goods, products or services; date of transaction; evaluation period; location goods shipped to; location of seller; location of buyer; and type of transaction. The tax compliance information generation engine 382 may change the compiling, including organization, of such data based on corresponding changing rules, about establishing nexus for purposes of remitting transaction tax in the plurality of tax jurisdictions 330. Such rules may include economic nexus requirements, for each jurisdiction and the tax compliance information generation engine 382 may monitor such changes in the rules for each jurisdiction and update the rules accordingly. For example, the tax compliance information generation engine 382 may access the rules from one or more sources, including, but not limited to, tax jurisdictions 330 of FIG. 3. Such rules and corresponding updates may be stored in database 346.

At 406, for each tax jurisdiction of the plurality of tax jurisdictions that is not the one or more tax jurisdictions in which the querying entity had already registered, the tax-assisting service platform 340 determines (e.g., via the tax compliance information generation engine 382) information regarding potential transaction tax compliance of the querying entity involving remitting transaction taxes for the tax jurisdiction based on the apportionment for that tax jurisdiction. Information indicative of such apportionment may be read or otherwise obtained from the record of the apportionment 410 generated previously at 404. The determination of information regarding potential transaction tax compliance of the querying entity may be performed by comparing the number of transactions and/or the monetary sales amount apportioned to each tax jurisdiction, and possibly entries received in response to the queries 364 of FIG. 3, against stored rules for the particular tax jurisdiction. For example, the stored rules for the particular tax jurisdiction may be rules about meeting or exceeding one or more thresholds regarding sales over a period of time (e.g., a monetary amount of sales and/or a volume of sales) and the record of apportionment may include information indicative of such monetary sales amounts of the querying entity applicable to the period of time.

Below are some examples of such rules for a sample group of individual tax jurisdictions in the U.S., which could have been stored in advanced, and consulted for making a determination. Of course, while the rules below are presented here in human-readable form for the benefit of the reader, it will be recognized that they may be advantageously stored as data with proper headings, and so on.

Idaho
Effective date: Jun. 1, 2019
Included transactions: Cumulative gross receipts from sales including taxable products and taxable services delivered into the state
Treatment of exempt transactions: Exempt sales and exempt services are included in the threshold count
Trigger: Sales only
Sales/transactions threshold: $100,000
Evaluation period: Threshold applies to the current or preceding calendar year
New Mexico
Effective date: Jul. 1, 2019

Included transactions: Taxable gross receipts from taxable sales, taxable services, leases, and licenses of products, and sales of licenses and services of licenses for use of real property sourced to the state
Treatment of exempt transactions: Exempt sales and exempt services are not included in the threshold count
Trigger: Sales only
Sales/transactions threshold: $100,000
Evaluation period: Threshold applies to the previous calendar year
Rhode Island
Effective date: Jul. 1, 2019
Included transactions: Sales of tangible personal property, prewritten computer software, and vendor-hosted prewritten software delivered electronically or by load and leave, and/or taxable services
Treatment of exempt transactions: Exempt sales are included but exempt services are not included in the threshold count
Trigger: Sales or transactions
Sales/transactions threshold: $100,000 or 200 transactions
Evaluation period: Threshold applies to the preceding calendar year
Texas
Effective date: Oct. 1, 2019
Included transactions: Sales of products and taxable services into the state
Treatment of exempt transactions: Exempt sales and exempt services are included in the threshold count
Trigger: Sales only
Sales/transactions threshold: $500,000
Evaluation period: Threshold applies to the previous 12-months, with the initial 12 calendar months beginning Jul. 1, 2018 through Jun. 30, 2019
Virginia
Effective date: Jul. 1, 2019
Included transactions: Gross revenue from retail sales and taxable services into the state
Treatment of exempt transactions: Exempt sales and exempt services are not included in the threshold count
Trigger: Sales or transactions
Sales/transactions threshold: $100,000 or 200 transactions
Evaluation period: Threshold applies to the current or previous calendar year For example, the tax compliance information generation engine 382 may find in the record of apportionment 410 that customer entity 311 was apportioned total sales of $550,000 of products and taxable services into Texas in the 12 months beginning Jul. 1, 2018 through Jun. 30, 2019. The tax compliance information generation engine 382 may then search the statutory rule threshold records 408 and find that the statutory threshold for Texas is $500,000. The tax compliance information generation engine 382 may then compare the $550,000 in total sales into Texas for customer entity 311 to the statutory threshold for Texas of $500,000 and record that it exceeds this statutory threshold for Texas. The tax compliance information generation engine 382 may perform such comparisons for each tax jurisdiction of the plurality of tax jurisdictions that is not the one or more tax jurisdictions in which the querying entity had already registered.

As another example, the tax compliance information generation engine 382 may find in the record of apportionment 410 that customer entity 311 was apportioned a total of 185 transactions for sales of tangible personal property into Rhode Island in the preceding calendar year. The tax compliance information generation engine 382 may then search the statutory rule threshold records 408 and find that the statutory threshold for Rhode Island is $100,000 total sales or 200 transactions. The tax compliance information generation engine 382 may then compare the 185 total number of transactions apportioned to Rhode Island for customer entity 311 to the statutory threshold for Rhode Island of 200 transactions and record that it is approaching this statutory threshold for Rhode Island (e.g., within a threshold number of 20 transactions of the 200 transaction threshold). Other thresholds may be used to determine whether the statutory threshold is being approached and such thresholds may be selectable by the customer entity and/or the tax compliance information generation engine 382. The comparison may include comparison of data representing various different other or additional criteria, which may, in some embodiments, be indicated by or otherwise based on the particular rules for specific jurisdictions including, but not limited to: type of goods, products or services sold; exempt goods, products or services; date of transaction; evaluation period; location goods shipped to; location of seller; location of buyer; and type of transaction. Records of apportionment which meet, exceed or are approaching statutory thresholds 414 may be generated by the tax-assisting service platform 340, based on the comparison.

At 416, for each tax jurisdiction of the plurality of tax jurisdictions that is not the one or more tax jurisdictions in which the querying entity had already registered, the tax-assisting service platform 340 communicates (e.g., via the TAE API 379 over network 194) to the querying entity (e.g., customer entity 311 of FIG. 3) the information regarding the potential lack of tax compliance of the querying entity for the particular tax jurisdiction. For example, the information regarding the potential lack of tax compliance may be presented within an interactive user interface or session in which the queries 364 were presented and the response to the queries 374 were submitted. For example, FIGS. 13N through 13P show example portions of a user interface of a tax nexus online interactive notification platform including tax-assisting service platform 340 presenting one or more reports regarding potential tax liability of the querying entity based on responses from the querying entity to prompts presenting queries for the querying entity, according to various embodiments of the present disclosure.

Additionally, audit records 412 of the apportionment of customer sales data 372, the comparison to statutory thresholds 406 and the communication of information regarding the potential lack of tax compliance to the querying entity may be generated and stored by the tax compliance information generation engine 382, and may also be accessible by the corresponding customer entities 310 and/or the ERP system 322.

Figure 5:
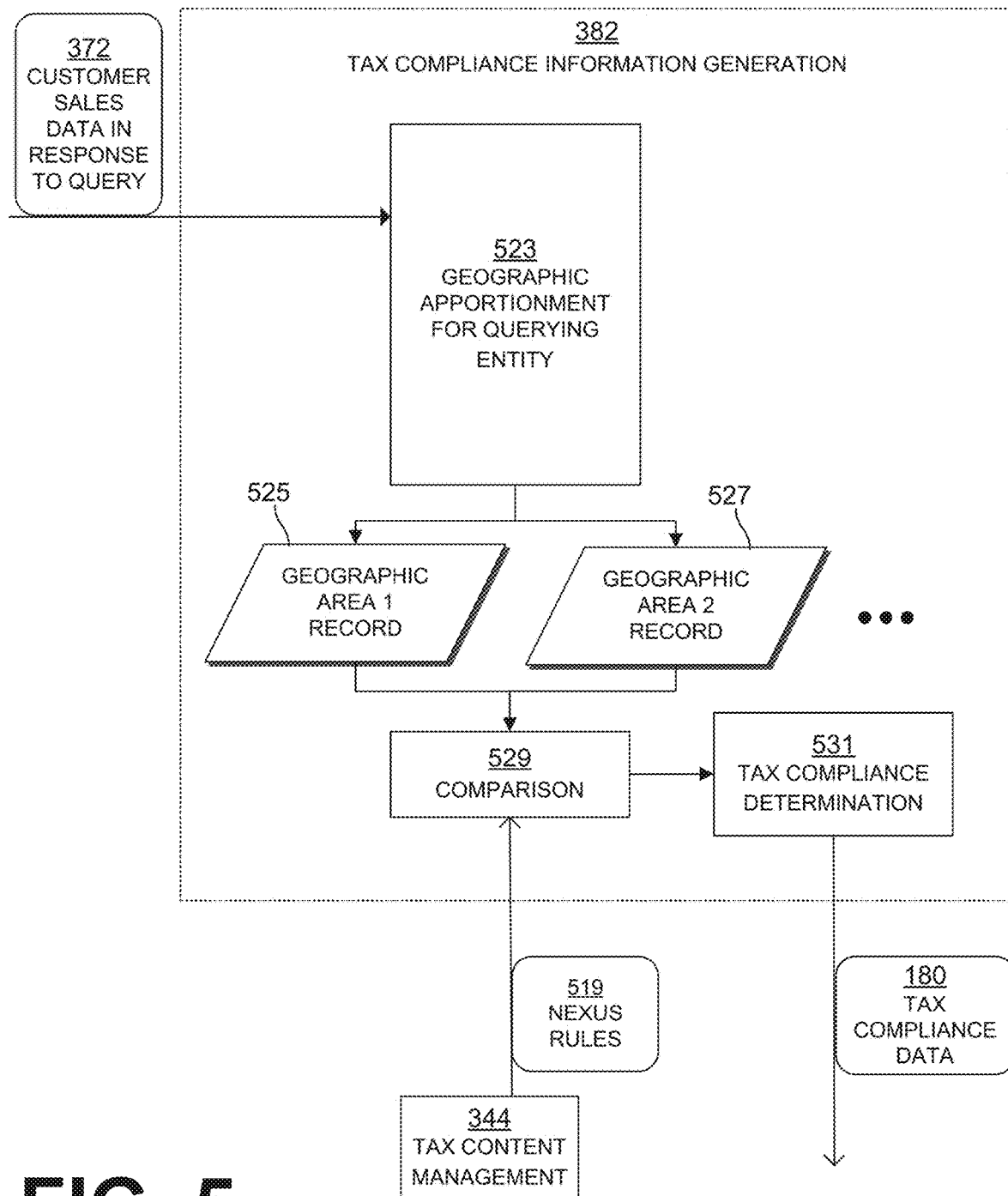
FIG. 5 is a block diagram showing more details of a tax compliance information generation engine of FIG. 3, according to various embodiments of the present disclosure.

FIG. 5 is a block diagram showing more details of a tax compliance information generation engine 382 of FIG. 3, according to various embodiments of the present disclosure.

Shown is a geographic apportionment engine 523 that may receive the customer sales data 372 in response to the queries 362 of FIG. 3. Such transaction data may include data representing, for an example querying entity (e.g., customer entity 311), a total monetary amount of sales (e.g., revenue) and/or a total volume of sales for a plurality of tax jurisdictions which are not tax jurisdictions in which the querying entity had already registered with one or more of the tax jurisdictions 330. Geographic apportionment engine 523 may receive the customer sales data 372 and compiled from one or more sources, including, but not limited to, data customer data 329 from database 328 and/or ERP system 322 of FIG. 3.

For each tax jurisdiction of the plurality of tax jurisdictions that is not one or more tax jurisdictions in which the querying entity had already registered, the geographic apportionment engine 523 may apportion to the tax jurisdiction one or more of: an apportioned number of transactions and an apportioned monetary sales amount, according to at least one criterion. Some or all of the information regarding a number of transactions and/or monetary sales may be obtained from or included as part of the customer sales data 372 and/or customer data 329. The criterion, for example, may include criterion regarding relative populations among the plurality of tax jurisdictions, and/or criterion regarding economic statistics about the plurality of tax jurisdictions. For example, jurisdictions with larger populations and/or larger economies indicated by the economic statistics may receive a proportionally larger apportioned number of transactions and/or a proportionally larger apportioned monetary sales amount.

The geographic apportionment engine 523 generates records of the apportionment indicating, for each tax jurisdiction of the plurality of tax jurisdictions that is not the one or more tax jurisdictions in which the querying entity had already registered, the apportioned number of transactions and/or the apportioned monetary sales amount for that jurisdiction. For example, the geographic apportionment engine 523 generates geographic area 1 record 525, which indicates the apportioned number of transactions and/or the apportioned monetary sales amount for the tax jurisdiction associated with geographic area 1 in which the querying entity (e.g., customer entity 311) has not yet registered. Also, the geographic apportionment engine 523 generates geographic area 2 record 527, which indicates the apportioned number of transactions and/or the apportioned monetary sales amount for the tax jurisdiction associated with geographic area 2 in which the querying entity (e.g., customer entity 311) has not yet registered. In the present example, the criterion for apportionment is based on relative populations among the geographic area 1 and geographic area 2. Thus, if geographic area 1 has a larger population than geographic area 2, then geographic area 1 record 525 could indicate a larger apportioned number of transactions and/or a larger apportioned monetary sales amount than geographic area 2 record 527, proportional to the larger size of the population of geographic area 1 as compared to geographic area 2.

Such data may be organized by total revenue and/or total transactions geographically per jurisdiction and per customer entity. Such data may also be organized according to other criteria, including, but not limited to: type of goods, products or services sold; exempt goods, products or services; date of transaction; evaluation period; location goods shipped to; location of seller; location of buyer; and type of transaction. The tax compliance information generation engine 382 may change the compiling, including organization, of such data based on corresponding changing rules, about establishing nexus for purposes of remitting transaction tax in the plurality of tax jurisdictions 330. Such rules may include economic nexus requirements, for each jurisdiction and the tax compliance information generation engine 382 may monitor such changes in the rules for each jurisdiction and update the rules accordingly. For example, the tax compliance information generation engine 382 may access the rules from one or more sources, including, but not limited to, tax jurisdictions 330 of FIG. 3. Such rules and corresponding updates may be stored in database 346.

Shown as receiving the geographic apportionment records (e.g., geographic area 1 record 525, geographic area 2 record 527, etc.) from the geographic apportionment engine 523 is the comparison engine 529. The comparison engine 529 may compare the geographic apportionment records from the example customer entity 311 to updated nexus rules 519 about establishing nexus for purposes of remitting transaction tax in the plurality of tax jurisdictions, which may include statutory rule threshold records from tax content management component 344. For example, the statutory rule threshold records from tax content management component 344 may include nexus rules 519 regarding a monetary amount of sales that are associated with each of various tax jurisdictions and/or a volume of sales transactions that are associated with each of various tax jurisdictions.

Shown coupled to the comparison engine 529 is the tax compliance determination engine 531. Based on such comparison made by the comparison engine 529, the tax compliance determination engine 531 may determine which records of the geographic apportionment records (e.g., geographic area 1 record 525, geographic area 2 record 527, etc.) indicate total numbers of apportioned transactions that meet, are within a predetermined threshold of meeting, and/or exceed one or more thresholds regarding sales for the corresponding individual tax jurisdiction associated with the geographical area. For example, based on such comparison made by the comparison engine 529, the tax compliance determination engine 531 may find that the total number of transactions apportioned to geographic area 1 record 525 for customer entity 311 exceed the threshold number of transactions in the applicable time period for the tax jurisdiction associated with geographic area 1. The tax compliance determination engine 531 may then determine there is a potential lack of tax compliance of the particular customer entity in the tax jurisdiction associated with geographic area 1 based on this finding. The tax compliance determination engine 531 may then generate tax compliance data 180, which, for example, may be, include, or reference notifications to the querying entity indicating potential lack of tax compliance in various jurisdictions.

Figure 6:
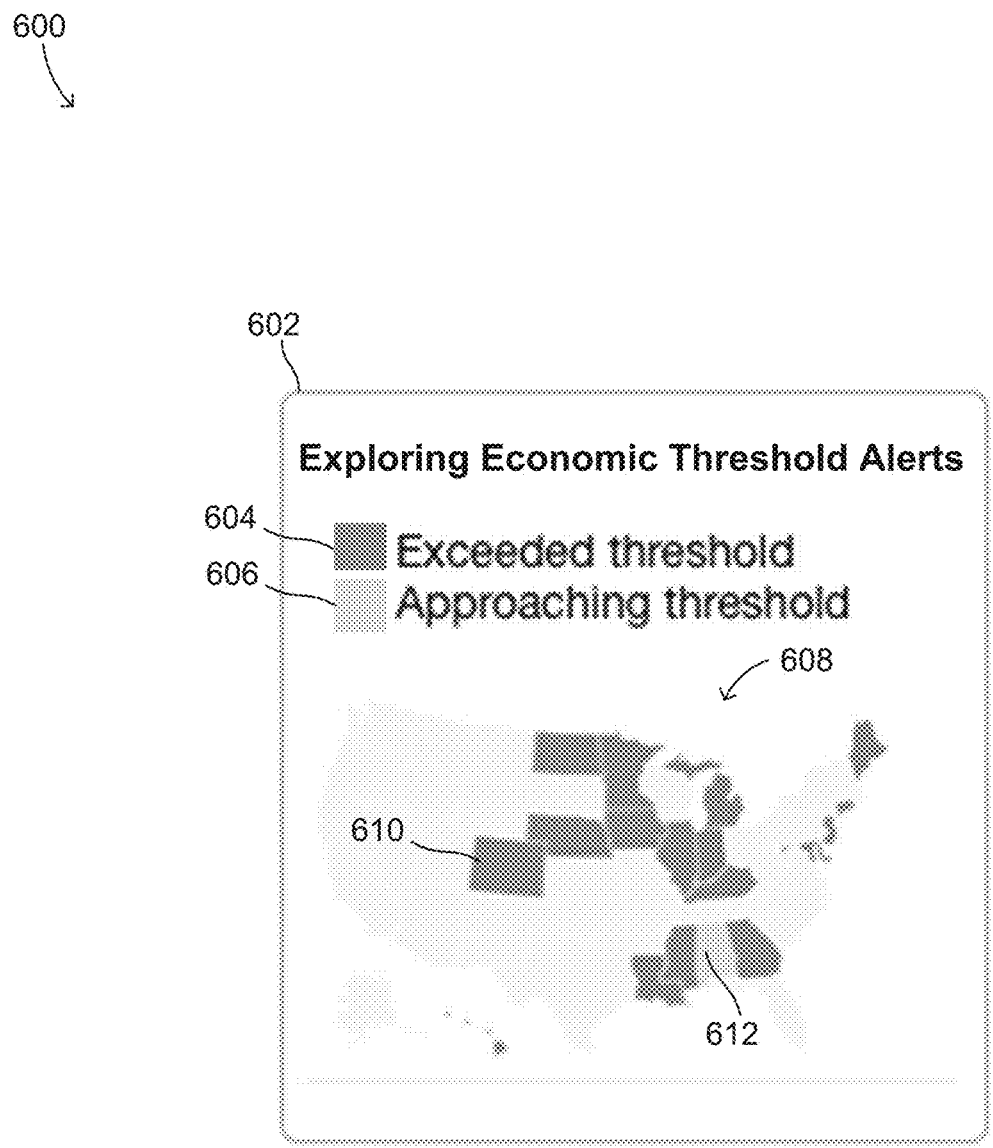
FIG. 6 depicts an example user interface showing example notifications about information regarding potential lack of tax compliance based on entries provided by a querying entity, according to various embodiments of the present disclosure.

FIG. 6 depicts an example user interface 600 showing example notifications about information regarding potential lack of tax compliance based on entries provided by a querying entity, according to various embodiments of the present disclosure.

User interface 600 includes a user interface screen 602 showing an example of information regarding potential lack of tax compliance of a particular querying entity (e.g., customer entity 313 of FIG. 3) for various tax jurisdictions. The user interface may include and/or represent tax compliance data 180. The tax-assisting platform 340, based on the determination that there is a potential lack of tax compliance of the querying entity, may generate the user interface 600, and/or instructions for presenting the user interface element 600, to be presented on a display of the querying entity (e.g., customer entity 311). Such a user interface 600 may be presented in response to receiving the response to the queries 371.

Shown is a map 608 of the U.S. having U.S. states highlighted in which the customer entity 313 has a potential lack of tax compliance, for example, as determined by the tax compliance determination engine 531 of the tax compliance information generation engine 382. In some embodiments, the states may be color coded or otherwise differently highlighted or marked to indicate whether a threshold for establishing nexus for purposes of remitting transaction tax in that state is being approached or has been exceeded. For example, the user interface screen 602 indicates that states for which the customer entity 313 has exceeded a threshold of that state for establishing nexus are colored dark gray 604 on the map 608. The user interface screen 602 indicates that states for which the customer entity 313 is approaching a threshold of that state for establishing nexus are colored light gray on the map 608.

In the example shown, among other states, the map 608 indicates, by coloring Colorado 610 dark gray 604, that customer 313 has exceeded the threshold of Colorado 610 for establishing nexus in that state. Also, the map 608 indicates, by coloring Alabama 612 light gray 606, that customer 313 is approaching the threshold of Alabama 612 for establishing nexus in that state. The user interface 602, including the map 608, may be updated dynamically, automatically and/or in real time or near real time by the tax compliance information generation engine 382 for the applicable customer entity as sales of the customer entity change, as indicated in the response to the queries 371, and/or rules for establishing nexus change for various jurisdictions. The user interface 602, including the map 608, may be accessible in an account associated with the particular customer entity and/or, in some embodiments, comprise or be included in an electronic notification regarding potential lack of tax compliance to the customer entity.

The map 608 may also be interactive, for example, such that the user may click on or otherwise select one or more states and receive further information, options, actions and/or features pertaining to potential lack of tax compliance of the customer entity for that jurisdiction. For example, a user of the customer entity 313 may click on Colorado 610 and electronically receive or be presented with one or more of: information regarding rules for establishing nexus in Colorado; reasons for which there was a determination of potential lack of tax compliance in Colorado; which transactions of customer entity 313 caused the determination of potential lack of tax compliance in Colorado; steps to become tax compliant in Colorado; options to select for the TAE 342 and/or the tax compliance information generation engine 382 to perform for customer entity 313 to become tax compliant in Colorado; options to select for the TAE 342 and/or the tax compliance information generation engine 382 to initiate or perform registration with Colorado's taxing agency for collecting and/or remitting transaction taxes; options to select for the TAE 342 and/or the tax compliance information generation engine 382 to initiate or perform set up of internal processes for collecting sales tax in Colorado in accordance with the tax rules of that state; options to select for the TAE 342 and/or the tax compliance information generation engine 382 to initiate or perform keeping of records for the collected sales tax for Colorado; options to select for the TAE 342 and/or the tax compliance information generation engine 382 to initiate or perform filing of reports with Colorado; options to select for the TAE 342 and/or the tax compliance information generation engine 382 to initiate or perform paying or otherwise remitting of transaction taxes to Colorado; and options to select for the TAE 342 and/or the tax compliance information generation engine 382 to initiate or perform requesting exemption certificates from tax exempt sellers for customer entity 313 in Colorado. In various embodiments, such operations may be performed by the TAE 342 and/or the tax compliance information generation engine 382 for various other particular jurisdictions and, at the selection of the particular customer entity, automatically in response to a determination by the tax compliance information generation engine 382 that there is a potential lack of tax compliance in the particular jurisdiction. For example, in response to the tax compliance information generation engine 382 determining that customer entity 313 has exceeded the threshold of Colorado 610 for establishing nexus in that state, the TAE 342 and/or the tax compliance information generation engine 382 may automatically cause an interactive user interface element to be presented on a display of the client computing device of customer entity 313 that, once selected, may automatically initiate a process of registering the customer entity 313 with Colorado's taxing agency for collecting and/or remitting transaction taxes and, in some embodiments, initiates or performs paying or otherwise remitting of transactions taxes to Colorado for customer entity 313.

Figure 7:
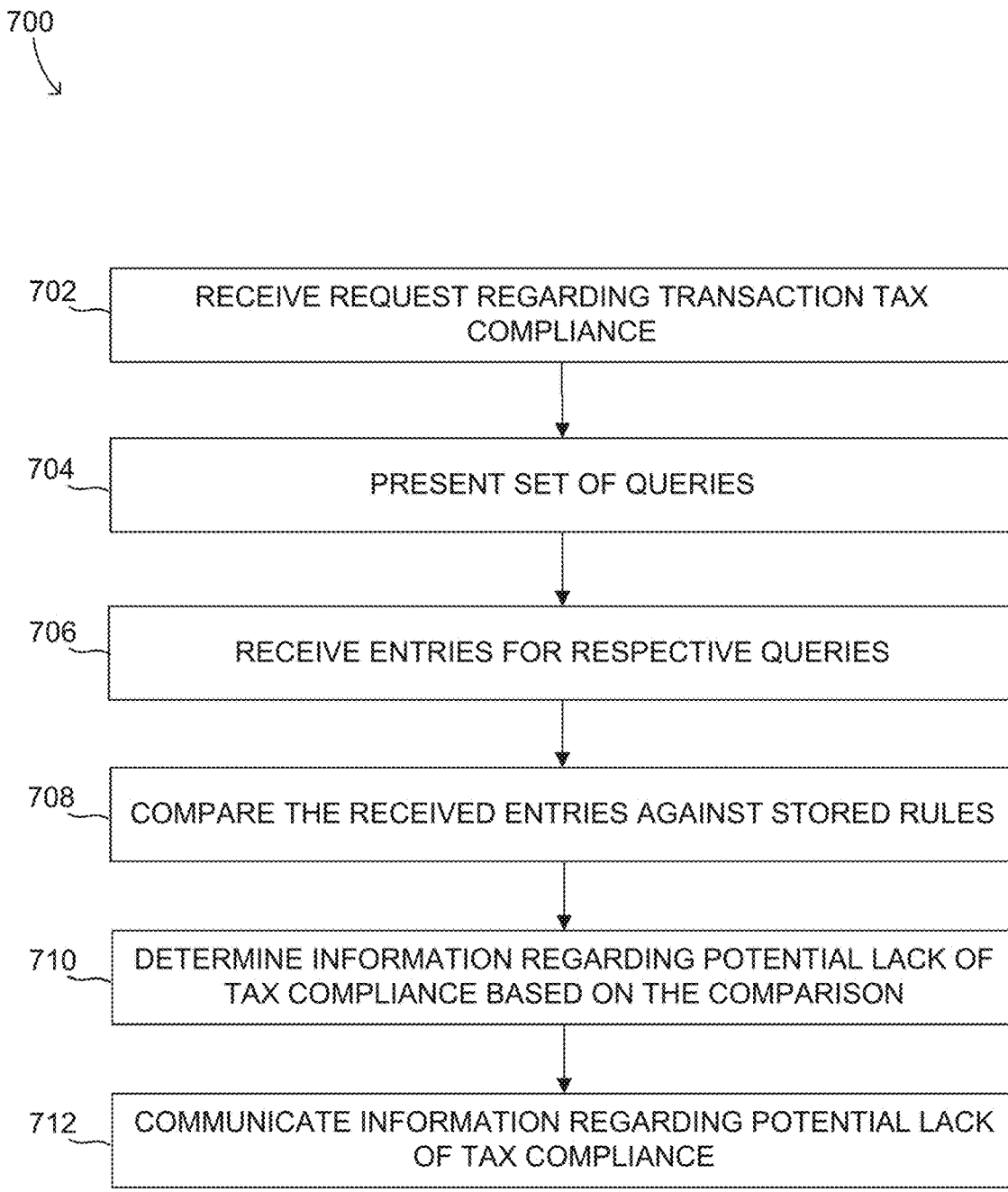
FIG. 7 is a flow diagram of an example process for generating information regarding potential lack of tax compliance of a querying entity and communicating corresponding information regarding potential lack of tax compliance, according to various embodiments of the present disclosure.

FIG. 7 is a flow diagram of an example process 700 for generating information regarding potential lack of tax compliance of a querying entity and communicating corresponding information regarding potential lack of tax compliance, according to various embodiments of the present disclosure.

At 702, the system 100 receives from a client computing device over a network, a request regarding transaction tax compliance of a querying entity.

At 704, the system 100, in response to receiving the request, presents to the client computing device over the network, a set of queries about goods or services sold by the querying entity. The set of queries may include one or more queries regarding goods or services sold by the querying entity over an indicated time period and/or other characteristics of the business. Such other characteristics of the business may be relevant to determining tax compliance of the querying entity. For example, the queries may be regarding other characteristics of the business of the querying entity, including, but not limited to characteristics regarding which jurisdictions the business is currently registered in to remit transaction taxes; types or categories of items or services sold; annual revenue; total transactions; average selling price; location(s) of the business, offices, employees, contractors, third-party affiliates or franchises, warehouses and/or e-commerce or web site servers; dates when started and/or stopped selling items or services; temporary locations of the business; Internet or e-commerce sales; use of cookies in Internet transactions; census information for various tax jurisdictions; physical and/or virtual marketplace locations of the business; e-commerce sales and/or sites; ownership of servers that run e-commerce sites of the business; third-party affiliates and/or franchises associated with the business; activities of third-party affiliates and/or franchises associated with the business; employee activities; locations where products are stored and/or shipped to; and/or shipping methods and activities.

At 706, the system 100 receives entries for respective ones of the queries. The entries may include customer sales data 372 and/or customer data 329. For example, the queries may be regarding, and the entries may include, information indicating sales over a period of time (e.g., a monetary amount of sales and/or a volume of sales) of the querying entity. The queries may be regarding, and the corresponding entries received in response to the queries may also include, other characteristics of the business of the querying entity, including, but not limited to characteristics regarding in which jurisdictions the business is currently registered to remit transaction taxes; types or categories of items or services sold; annual revenue; total transactions; average selling price; location(s) of the business, offices, employees, contractors, third-party affiliates or franchises, warehouses and/or e-commerce or web site servers; dates when started and/or stopped selling items or services; temporary locations of the business; Internet or e-commerce sales; use of cookies in Internet transactions; census information for various tax jurisdictions; physical and/or virtual marketplace locations of the business; e-commerce sales and/or sites; ownership of servers that run e-commerce sites of the business; third-party affiliates and/or franchises associated with the business; activities of third-party affiliates and/or franchises associated with the business; employee activities; locations where products are stored and/or shipped to; and/or shipping methods and activities.

At 708, the system 100 compares the received entries against stored rules for a certain one of a plurality of tax jurisdictions, the stored rules being about establishing nexus for purposes of remitting transaction tax in the certain tax jurisdiction. The set of queries may include a query regarding prior registration of the querying entity with a tax agency in one or more of the plurality of tax jurisdictions for purposes of remitting transaction taxes. The entries may include an indication of a particular tax jurisdiction for which the querying entity had already registered as a seller for purposes of remitting transaction taxes in the particular tax jurisdiction. In such a case, the system 100 may select the certain tax jurisdiction to be a tax jurisdiction other than the particular tax jurisdiction based on the indication of the particular tax jurisdiction for which the querying entity had already registered as a seller.

In some embodiments, the comparing the received entries against the stored rules for the additional tax jurisdiction may include comparing the information indicative of monetary sales amounts of the querying entity to the one or more thresholds regarding sales. Additionally or alternatively, the comparing the received entries against the stored rules for the additional tax jurisdiction may include comparing the information indicative of the number of transactions of the querying entity to the one or more thresholds regarding a number of transactions over the period of time. These tax jurisdictions can be anywhere in the world. In some embodiments, the plurality of tax jurisdictions are those of the United States of America.

At 710, the system 100 determines information regarding potential lack of tax compliance of the querying entity for the certain tax jurisdiction based on the comparison.

At 712, the system 100 communicates to the client computing device over the network, the information regarding the potential lack of tax compliance. The notification may be by email, by indications in a GUI such as the one of FIG. 6, and so on.

Figure 8:
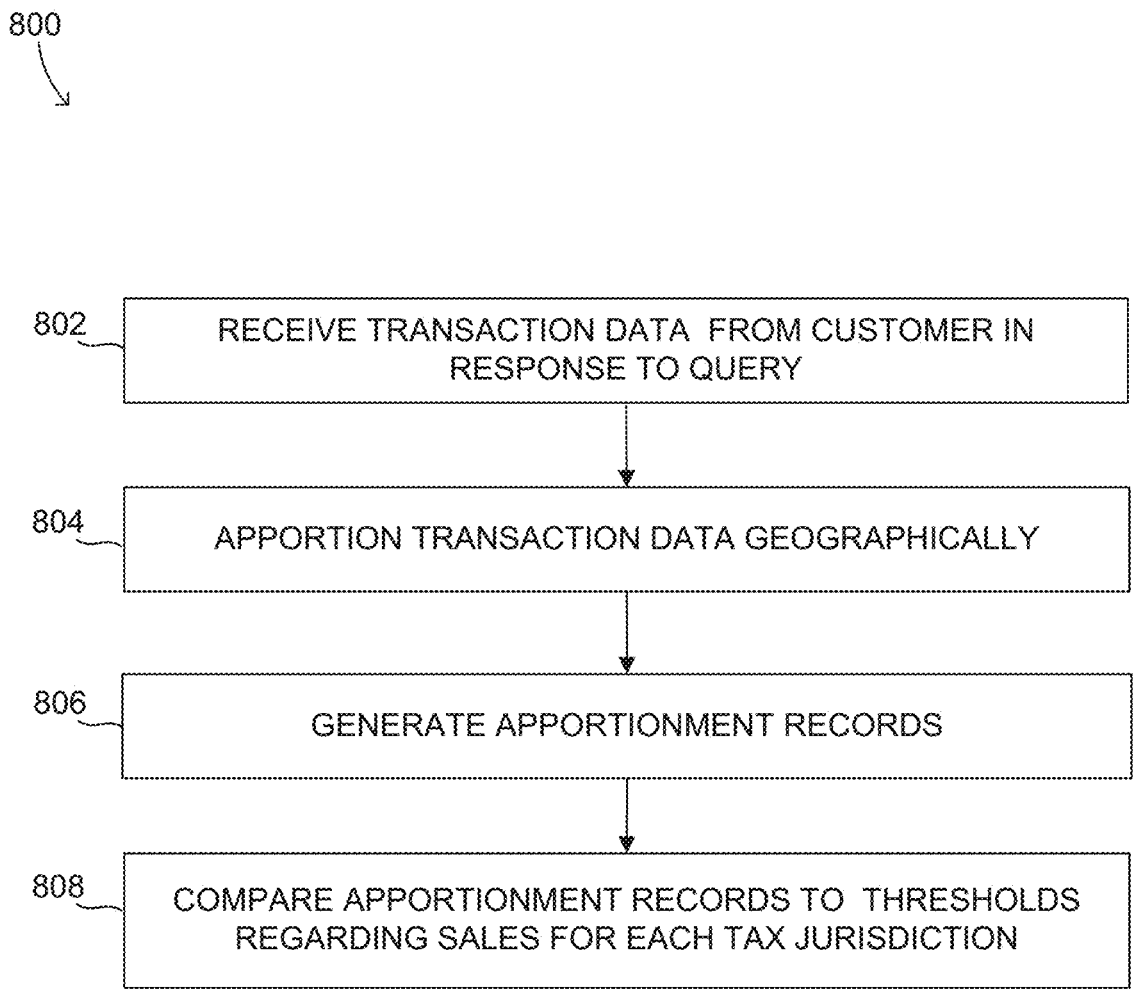
FIG. 8 is a flow diagram of an example process useful in generating information regarding potential lack of tax compliance, according to various embodiments of the present disclosure.

FIG. 8 is a flow diagram of an example process 800 useful in generating information regarding potential lack of tax in compliance, according to various embodiments of the present disclosure.

At 802, the system 100 receives entries for respective ones of queries sent to the querying entity. For example, in response to receiving a request, the system 100 may present to the client computing device over the network 194, a set of queries about goods or services sold by the querying entity. These queries may be as described for operation 704 above. The system 100 then receives entries for respective ones of the queries.

At 804, the system 100 may apportion transaction data geographically. For example, the system 100 may associate a plurality of tax jurisdictions with the querying entity based on the received entries for respective ones of queries sent to the querying entity. Each tax jurisdiction associated with the querying entity may correspond to or otherwise be associated with a particular geographical area. For purposes of apportionment, the system 100 may also filter out any tax jurisdictions in which the querying entity had already registered for remitting transaction taxes. For example, for each tax jurisdiction associated with the querying entity, the system 100 may apportion to the tax jurisdiction one or more of: an apportioned number of transactions and an apportioned monetary sales amount, according to at least one criterion. Some or all of the information regarding a number of transactions and/or monetary sales may be obtained from or included as part of the customer sales data 372 and/or customer data 329. The criterion, for example, may include a criterion regarding relative populations among the plurality of tax jurisdictions, and/or criteria regarding economic statistics about the plurality of tax jurisdictions. For example, jurisdictions with larger populations and/or larger economies indicated by the economic statistics may receive a proportionally larger apportioned number of transactions and/or a proportionally larger apportioned monetary sales amount.

At 806, the system 100 generates records of the apportionment indicating, for each tax jurisdiction of the plurality of tax jurisdictions associated with the querying entity, the apportioned number of transactions and/or the apportioned monetary sales amount for that jurisdiction. Such data may be organized by total revenue and/or total transactions geographically per jurisdiction and per customer entity. Such data may also be organized according to other criteria, including, but not limited to: type of goods, products or services sold; exempt goods, products or services; date of transaction; evaluation period; location goods shipped to; location of seller; location of buyer and type of transaction.

At 808, the system 100 compares the apportionment records to thresholds regarding sales for each tax jurisdiction. Such comparison may be to determine information regarding potential transaction tax compliance of the querying entity involving remitting transaction taxes for each tax jurisdiction based on the apportionment. In one embodiment, the system compares the number of transactions and/or the monetary sales amount apportioned to each tax jurisdiction associated with the querying entity, and possibly entries received in response to the queries 364 of FIG. 3, against stored rules for the particular tax jurisdiction. For example, the stored rules for the particular tax jurisdiction may be rules about meeting or exceeding one or more thresholds regarding sales over a period of time (e.g., a monetary amount of sales and/or a volume of sales) and the apportionment records may include information indicative of such monetary sales amounts of the querying entity applicable to the period of time.

Figure 9:
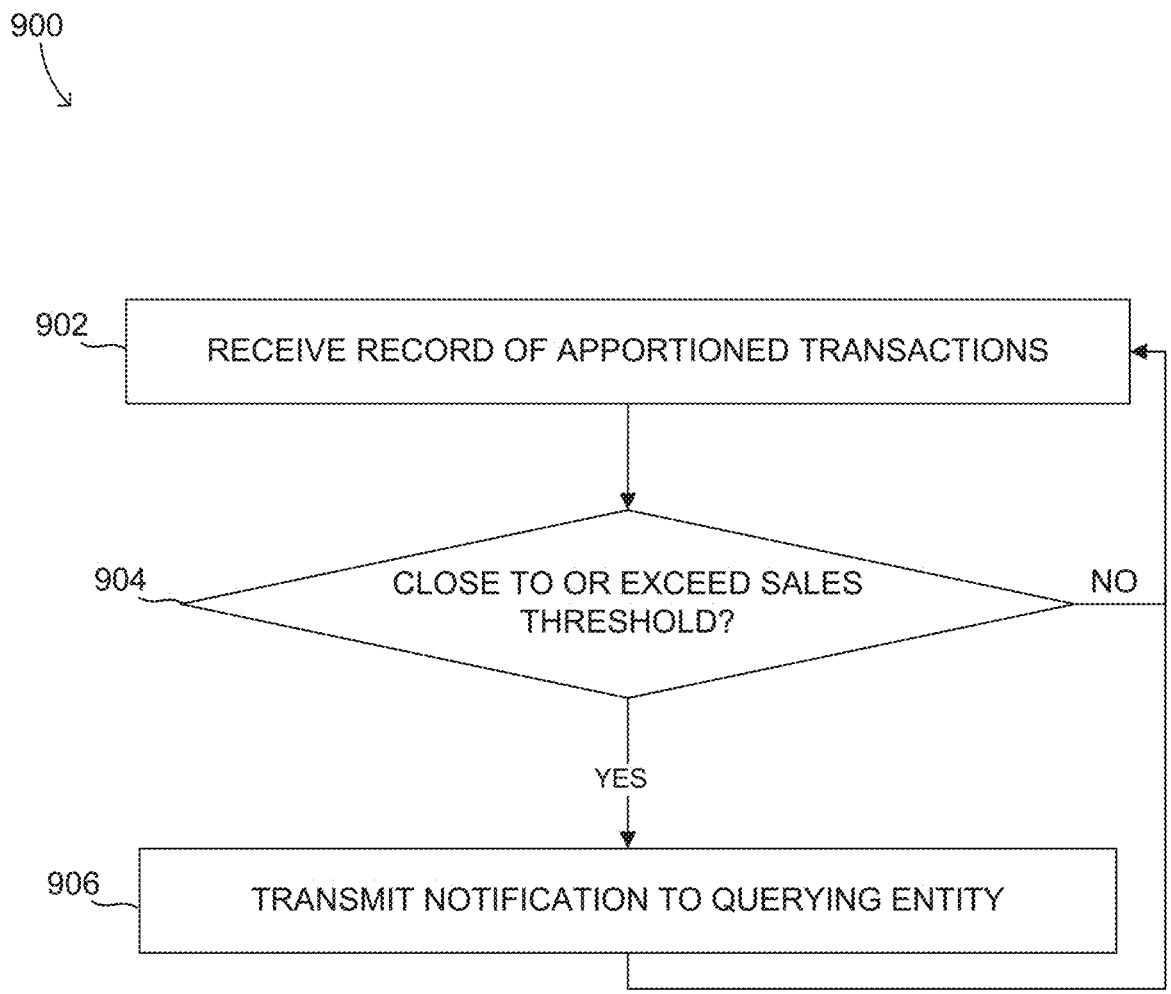
FIG. 9 is a flow diagram of an example process useful in determining for an entity whether there is a potential lack of tax compliance in a tax jurisdiction based on apportioned transactions, according to various embodiments of the present disclosure.

FIG. 9 is a flow diagram of an example process 900 useful in determining for an entity whether there is a potential lack of tax compliance in a tax jurisdiction based on apportioned transactions, according to various embodiments of the present disclosure.

At 902, the system 100 receives a record of apportioned transactions. For example, the record of apportioned transactions may be transactions apportioned to a particular tax jurisdiction.

At 904, the system 100 makes a determination of whether the apportioned transactions are close to or exceed a sales threshold. For example, this may be a threshold regarding sales over a period of time (e.g., a monetary amount of sales and/or a volume of sales) that when crossed establishes nexus for purposes of remitting transaction tax in the particular tax jurisdiction, according to stored rules for the particular tax jurisdiction. If it is determined that the apportioned transactions are close to or exceed the sales threshold, then the process 900 may proceed to 906. If it is determined that the apportioned transactions are not close and do not exceed the sales threshold, then the process 900 proceeds back to 902.

At 906, the system transmits a notification to the querying entity. For example, the notification may include information regarding a potential lack of tax compliance of the querying entity in the particular tax jurisdiction for which it was determined at 904 that the apportioned transactions are close to or exceed the sales threshold for that particular tax jurisdiction. The notification can be by an email, or a notification within a private User Interface (UI), such as is shown in FIG. 6.

The process 900 may then proceed back to 902, where another record of apportioned transactions is received for another tax jurisdiction associated with the querying entity.

Figure 10:
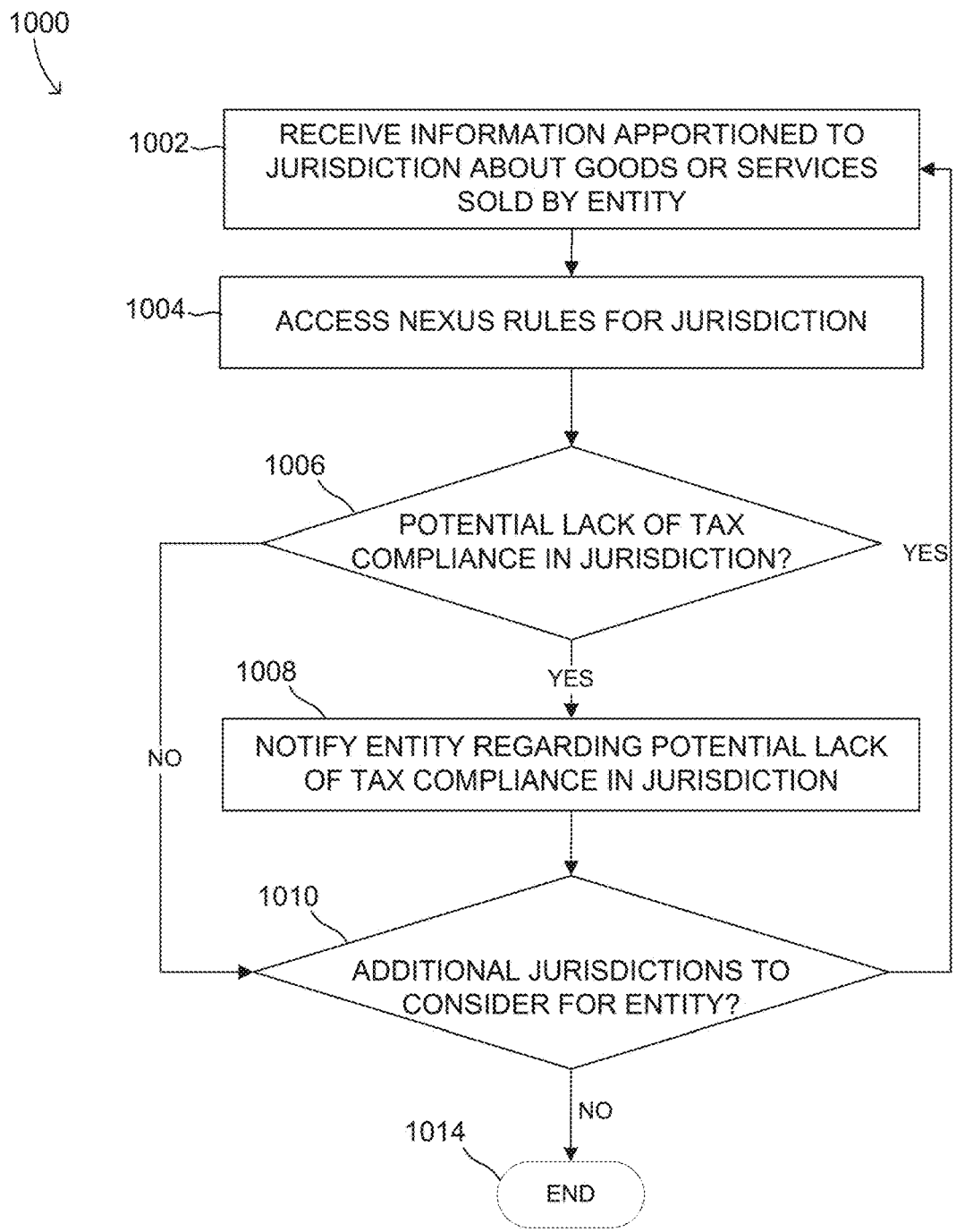
FIG. 10 is a flow diagram of an example process for notifying an entity whether there is a potential lack of tax compliance in a plurality of jurisdictions, according to various embodiments of the present disclosure.

FIG. 10 is a flow diagram of an example process 1000 for notifying an entity whether there is a potential lack of tax compliance in a plurality of jurisdictions, according to various embodiments of the present disclosure.

At 1002, the system 100 receives information apportioned to a tax jurisdiction about goods or sold by an entity.

At 1004, the system 100 accesses nexus rules for the tax jurisdiction. For example, the system 100 may access stored rules being about establishing nexus for purposes of remitting transaction tax in the tax jurisdiction.

At 1006 the system 100 makes a determination of whether there is a potential lack of tax compliance of the entity in the tax jurisdiction. For example, the system 100 makes a determination of whether there is a potential lack of tax compliance of the entity in the tax jurisdiction based on a comparison of the information apportioned to the tax jurisdiction about goods or services sold by the entity to the nexus rules for the tax jurisdiction. In response to determining that there is a potential lack of tax compliance of the entity in the tax jurisdiction, the process 1000 may proceed to 1008. In response to determining that there is no potential lack of tax compliance of the entity in the tax jurisdiction, the process 1000 may proceed to 1010.

At 1008, the system 100 notifies the entity regarding the potential lack of tax compliance in the tax jurisdiction.

At 1010, the system 100 makes a determination of whether there are additional tax jurisdictions to consider for the entity. For example, the system 100 may determine whether there are additional tax jurisdictions to consider whether there is a potential lack of tax compliance of the entity in those jurisdictions. In response to determining that there are additional tax jurisdictions to consider for the entity, the process 1000 may return to 1002. In response to determining that there are no additional tax jurisdictions to consider for the entity, the process 1000 proceeds to 1014, where it ends.

Figure 11:
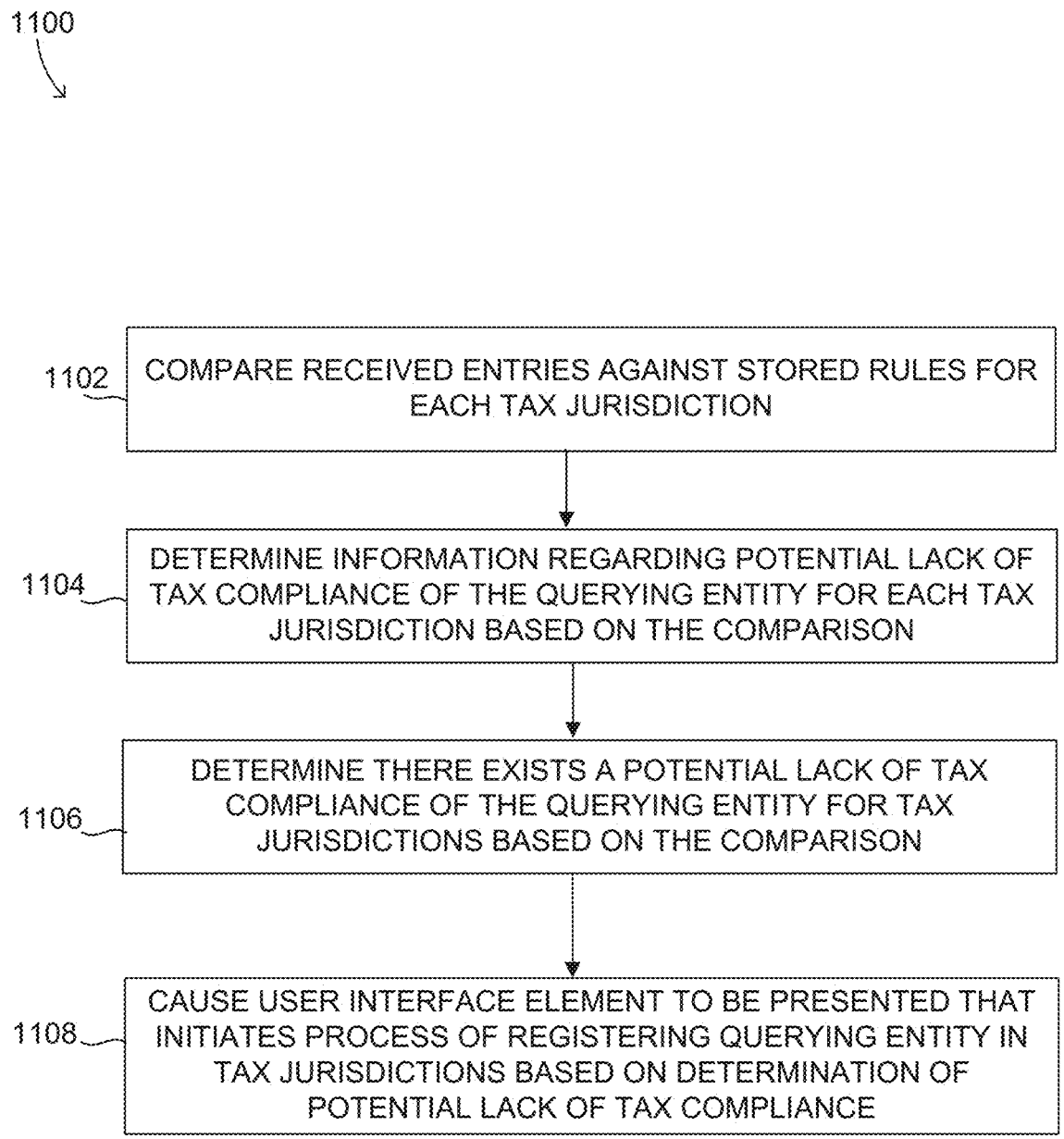
FIG. 11 is a flow diagram of an example process causing a user interface element to be presented that may initiate a process of registering querying entity for tax purposes, according to various embodiments of the present disclosure.

FIG. 11 is a flow diagram of an example process 1100 causing a user interface (UI) element to be presented that initiates a process of registering querying entity for tax purposes, according to various embodiments of the present disclosure.

At 1102, the system 100 compares received entries against stored rules for each tax jurisdiction of a plurality of tax jurisdictions. For example, the entries may be received in response to queries communicated to the querying entity about sales and other characteristics of the business of the querying entity and the stored rules for each tax jurisdiction may be about establishing nexus for purposes of remitting transaction tax in each tax jurisdiction of the plurality of tax jurisdictions. Examples of such a transaction tax include a sales tax, a use tax, and so on.

At 1104, the system 100 determines information regarding potential lack of tax compliance of the querying entity for each tax jurisdiction based on the comparison of the received entries against the stored rules for each tax jurisdiction.

At 1106, the system 100 determines that there exists a potential lack of tax compliance of the querying entity for one or more tax jurisdictions of the plurality of tax jurisdictions based on the comparison of the received entries against the stored rules for each tax jurisdiction.

At 1108, the system 100 causes, for each of the tax jurisdictions in which it was determined there exists a potential lack of tax compliance of the querying entity, an interactive user interface element to be presented on a display of the client computing device of the querying entity that, once selected, automatically initiates a process of registering the querying entity in the tax jurisdiction for purposes of remitting transaction taxes in the tax jurisdiction. This may be in response to, or otherwise based on, the determination by the system 100 that there is a potential lack of tax compliance of the querying entity for those tax jurisdictions. Examples of such user interface elements which initiate a process of registering the querying entity in the tax jurisdiction for purposes of remitting transaction taxes in the tax jurisdiction, according to one embodiment, are user interface element 1392 and user interface element 1393 shown in FIG. 13P.

FIGS. 12A-12D, taken in sequence, depict a flow diagram of an example process 1200 of a tax nexus online interactive notification platform of the system 100, according to various embodiments of the present disclosure. In particular, FIGS. 12A-12D depict example queries (e.g., examples of queries 364 of FIG. 3) and/or types of queries presented to a client computing device of a querying entity and the results of a determination of potential lack of tax compliance based on entries received in response to the queries. For example, the queries and/or types of queries depicted in FIGS. 12A-12D may be presented by the tax-assisting service platform 340 of FIG. 3 to the client computing device of the querying entity (e.g., customer entity 311) in response to a request 1202 from the querying entity regarding transaction tax compliance of the querying entity. The process 1200 includes multiple steps in which queries are presented and corresponding responses are received from the querying entity in the form of input provided as entries in reply to the queries. Each step may present queries and the queries presented in the following steps may be intelligently determined by the system 100 based on the responses received to queries presented in preceding steps, thus increasing the efficiency of automated determination of potential lack of tax compliance of the querying entity for various tax jurisdictions.

For example, in step 1 "Current State" 1204, the system 100 presents one or more queries to determine tax jurisdictions in which the querying entity is already registered. This is in order to limit the determination of potential lack of tax compliance of the querying to tax jurisdictions in which the querying entity is not already registered. This increases the speed and efficiency of the automated determination of potential lack of tax compliance of the querying entity for various tax jurisdictions by eliminating superfluous system data accesses, comparisons and calculations for tax jurisdictions in which the querying entity is already registered as a seller for purposes of remitting transaction taxes. From this step 1, responses may be received by the user. In addition, such responses may be based on information acquired through a third-party entity where applicable. Such may be available especially where there is an effort to automate the process.

In step 2 "Physical Nexus" 1206, the system 100 presents one or more queries to determine physical location information regarding the business of the querying entity relevant to determining potential lack of tax compliance of the querying entity for various tax jurisdictions. Such queries may be at least partially based on the responses to the queries presented in preceding step 1 "Current State" 1204. For example, the queries presented in step 2 "Physical Nexus" 1206 may be based on stored rules about establishing nexus for purposes of remitting transaction tax in tax jurisdictions for which the querying entity has not yet registered as a seller. The queries of step 2 "Physical Nexus" 1206 may also collect information indicating start dates of physical activities and permanent or temporary presence in various tax jurisdictions for various components of the business (e.g., offices and people associated with the business) relevant to determining potential lack of tax compliance of the querying entity for various tax jurisdictions.

In step 3 "Economic Nexus" 1208, the system 100 presents one or more queries to determine economic information regarding the business of the querying entity relevant to determining potential lack of tax compliance of the querying entity for various tax jurisdictions. For example, the system 100 may present one or more queries regarding sales of the business over a period of time (e.g., a monetary amount of sales and/or a volume of sales). Also, the system 100 may provide user interface elements that comprise selectable options from which the querying entity may select that indicate how data regarding sales of the business is to be provided. Such options may be designated along a scale with respect to how accurate or precise the sales data or sources of sales data to be provided will likely be, and thus how accurate or precise the resulting determination by the system 100 of potential lack of tax compliance of the querying entity for various tax jurisdictions will be. A coarse such scale could provide only a few categories, such as three ("low", "medium" and "high"), or many more than just a few. For example, if only three categories are thus provided, the querying entity may select "—Low—Census Estimate" element to indicate the source of sales data is to be an estimate based on an apportionment of total sales of the business proportional to the population of the applicable tax jurisdiction based on census data. The querying entity may select "—Medium—Customer Transaction Import" element to indicate the source of sales data is transactional sales data to be imported to the system 100 by the customer (e.g., the querying entity). The querying entity may select "—High—Existing tax-assisting platform account user (sync my data)" element to indicate the querying entity is an existing tax-assisting platform account user and the source of the sales data will be from an automatic synchronization of the most recent and accurate data from the querying entity, which has the highest likelihood to be current and accurate and thus result in the highest likelihood that the resulting determination by the system 100 of potential lack of tax compliance of the querying entity for various tax jurisdictions will be accurate and precise.

However, if the querying entity indicates in step 3 "Economic Nexus" 1208 that it is not already selling any products or services, then such queries regarding how data regarding sales of the business is to be provided may be avoided. This improves the technology of automated determination of potential lack of tax compliance by increasing the speed and efficiency of the technology of automated determination of potential lack of tax compliance of the querying entity for various tax jurisdictions by eliminating superfluous queries, system data accesses, comparisons and calculations.

In step 4 "Affiliate Nexus" 1210, the system 100 presents one or more queries to determine information regarding activities of, locations of, and relationships to partners or affiliates of the querying entity's business relevant to determining potential lack of tax compliance of the querying entity for various tax jurisdictions. For example, in step 4 "Affiliate Nexus" 1210, the system may first present a query whether the business has or works with partners or affiliates. If the response entry is "Yes", then the system 100 may proceed to present further queries regarding such partners or affiliates and related activities relevant to determining potential lack of tax compliance, for example, regarding use of cookies in Internet transactions involving such partners or affiliates and the associated tax jurisdictions and start dates. However, if the querying entity indicates step 4 "Affiliate Nexus" 1210 that there are no such partners or affiliates, then such queries regarding such partners or affiliates and related activities may be avoided. This increases the speed and efficiency of the technology of automated determination of potential lack of tax compliance of the querying entity for various tax jurisdictions by eliminating superfluous queries, system data accesses, comparisons and calculations.

In step 5 "Marketplace Nexus" 1212, the system 100 presents one or more queries to determine information regarding marketplace activities of the querying entity. For example, a marketplace may be an online or e-commerce marketplace where the owner or manager of the marketplace provides various warehousing, shipping, payment and/or fulfillment services for businesses selling items or services via the marketplace web site, mobile application or other portal. For example, if the querying entity indicates in response to such queries that sells items on a marketplace, the system 100 may present further queries regarding such sales, the identity of the marketplace(s) and the fulfillment relationship between the business of the querying entity and the marketplace(s), which may be relevant to determining potential lack of tax compliance of the querying entity for various tax jurisdictions. Also, if the querying entity indicates in response to such queries that it is a marketplace itself, the system 100 may present further queries regarding where the merchants on the marketplace make sales, which may be relevant to determining potential lack of tax compliance of the querying entity for various tax jurisdictions. However, if the querying entity indicates step 5 "Marketplace Nexus" 1210 that it does not have marketplace sales and it is not a marketplace itself, then such additional queries regarding marketplace sales and activities may be avoided. This increases the speed and efficiency of the technology of automated determination of potential lack of tax compliance of the querying entity for various tax jurisdictions by eliminating superfluous queries, system data accesses, comparisons and calculations.

In step 6 "Who are you" 1214 the system 100 presents one or more queries to determine information regarding the identification of the business personal information of the querying entity relevant to the determination and/or communication of the determination of potential lack of tax compliance of the querying entity. An entity merely exploring may maintain this exploration anonymous, by tentatively giving false data about its identity. Of course, if the address it enters is false, such as in a different state, this may create a problem in determining accurately any tax risk exposure. In addition, data received so far may be preserved by system 100. In some embodiments, if the entity wants to become a customer and it has given correct data so far, system 100 may enable the entity to upload that data as a customer with a single click, and any previous such false data may need to be corrected. In addition, any information covered in this document regarding nexus information may be imported in an expedited fashion, for example either through upload from the user or a third-party service, in order to obtain the most accurate information or simply to automate the nexus exploration.

In step 7 "Results" 1216 the system 100 presents results including a determination of potential lack of tax compliance based on entries received in response to the queries. For example, the results may be in the form of a recommendation presented from the tax-assisting service platform 340 that includes indications of tax jurisdictions in which the querying entity has high exposure to a potential lack of tax compliance as well as an analysis of the associated tax risk.

The recommendation may also include an indication of new tax jurisdictions in which the business of the querying entity may register as a seller, including those jurisdictions in which the querying entity has high exposure to a potential lack of tax compliance, and information on obtaining business licenses in such jurisdictions. As part of the recommendation, the tax-assisting service platform 340 may also present an interactive user interface element on a display of the client computing device of the querying entity that, once selected, initiates a process of registering the querying entity in the tax jurisdiction(s) in which the querying entity has an indicated high exposure to a potential lack of tax compliance for purposes of remitting transaction taxes in those tax jurisdiction(s). Additional such processes may be initiated for related operations, for example for filing returns for these jurisdictions, and even remitting payments in these jurisdictions.

Additionally, the tax-assisting service platform 340 may present as a selectable user interface element an option to the querying entity as a potential prospect to subscribe to or buy one or more services provided by tax-assisting service platform 340 (e.g., on a trial basis). For example, the querying entity may select a selectable user interface element to enroll as a tax-assisting platform account user to receive tax liability calculation services and to have the tax-assisting service platform 340 calculate the amount of tax due for future transactions. Such services may also include having the source of the sales data of the querying entity for purposes of determining potential lack of tax compliance of the querying entity in other jurisdictions be an automatic synchronization of the most recent and accurate transaction data from the querying entity. The tax-assisting service platform 340 may also or instead email or otherwise communicate to the querying entity expanded results of the determination of potential lack of tax compliance based on entries received in response to the queries, which may include further analysis and details indicating how and why there exists a potential lack of tax compliance in various tax jurisdictions and recommendations for proceeding.

At 1218, the process ends resulting in the benefit of the querying entity knowing in a more timely and efficient manner the tax jurisdictions in which to collect transactions taxes and what solutions are available from the tax-assisting service platform 340 that can help the querying entity become and remain compliant with the vast number of varying tax rules of the different tax jurisdictions, thus increasing the speed and efficiency of the technology of automated determination of potential lack of tax compliance of the querying entity for various tax jurisdictions.

FIGS. 13A-13M example portions of a user interface 1302 of a tax nexus online interactive notification platform, such as tax-assisting service platform 340, prompting a querying entity, such as example customer entity 311 with queries relevant to determining potential lack of tax compliance of the querying entity for various tax jurisdictions (e.g., examples of queries 364 of FIG. 3). For example, such queries may be presented in response to receiving a request regarding transaction tax compliance, such as the request 360 of FIG. 3. In various embodiments, many of the queries shown in FIGS. 13A-13M may be used in and/or applicable to the example embodiment of process 1200 illustrated in FIGS. 12A-12D of a tax nexus online interactive notification platform, such as tax-assisting service platform 340 of the system 100. However, the queries shown FIGS. 13A-13M also show additional and different example embodiments of individual queries that may be presented in different embodiments of such a process of a tax nexus online interactive notification platform, such as tax-assisting service platform 340 and as described further herein.

Figure 13A:
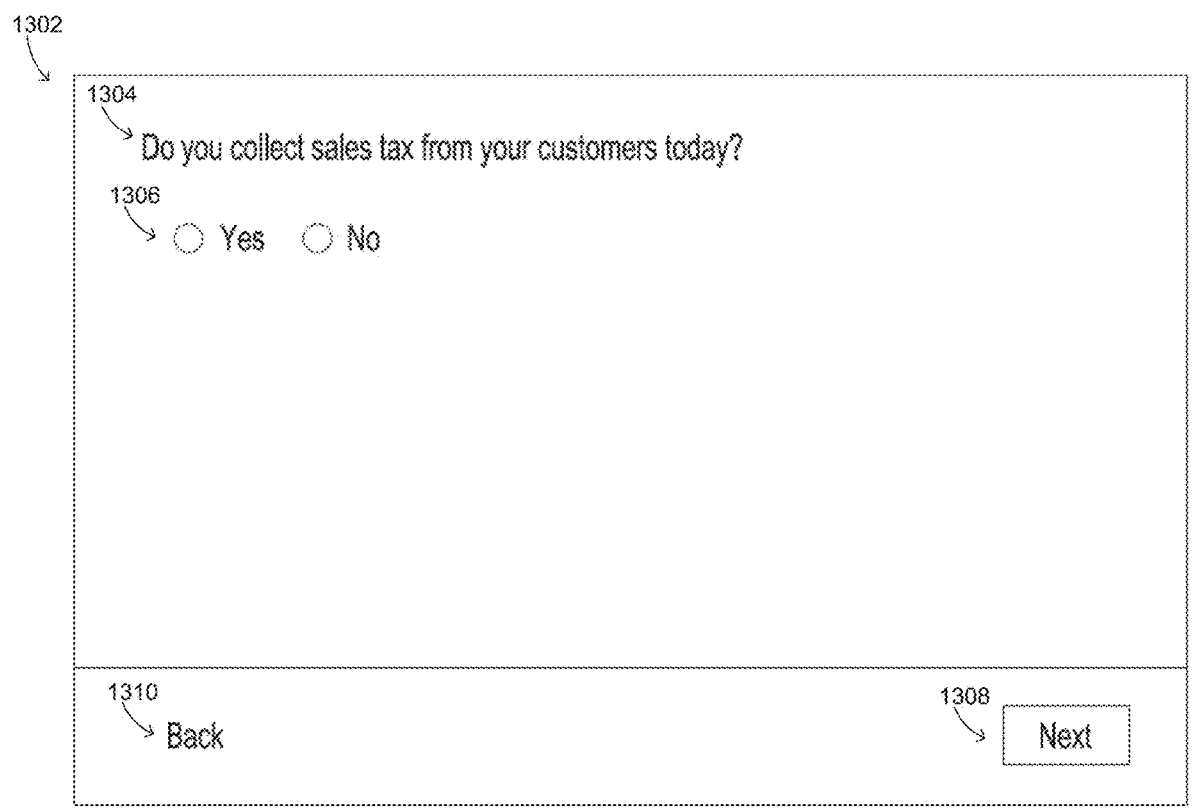
FIG. 13A is an example portion of a user interface of a tax nexus online interactive notification platform prompting a querying entity with a query regarding whether the querying entity currently collects tax from its customers, according to various embodiments of the present disclosure.

FIG. 13A is an example portion of a user interface 1302 of a tax nexus online interactive notification platform prompting a querying entity with a query 1304 regarding whether the querying entity currently collects tax from its customers, according to various embodiments of the present disclosure. Shown is a selectable user interface element 1306, which a user representing the querying entity may select to indicate "Yes" or "No" to the query regarding whether the querying entity currently collects tax from its customers.

Also shown is selectable user interface element 1308 that the user may select to proceed to the next query and selectable user interface element 1310 that the user may select to return back to a previous screen. Corresponding selectable user interface elements that the user may select to proceed to the next query and that the user may select to return back to a previous screen or query are also shown on other example portions of the user interface of FIGS. 13A-13P and perform corresponding functions in those portions of the user interface and thus are not individually referenced herein further.

If the user selects "No" from the selectable user interface element 1306 in response to the query 1304 regarding whether the querying entity currently collects tax from its customers, the next query regarding where the querying entity is currently registered to collect sales tax from its customers may be avoided, thus increasing the speed and efficiency of the automated determination of potential lack of tax compliance of the querying entity. For example, in some embodiments, the user interface 1302 prompting a querying entity with a query 1304 regarding whether the querying entity currently collects tax from its customers may be an initial query in, or a query preceding, step 1 "Current State" 1204 of FIG. 12A to determine tax jurisdictions in which the querying entity is already registered.

Figure 12A:
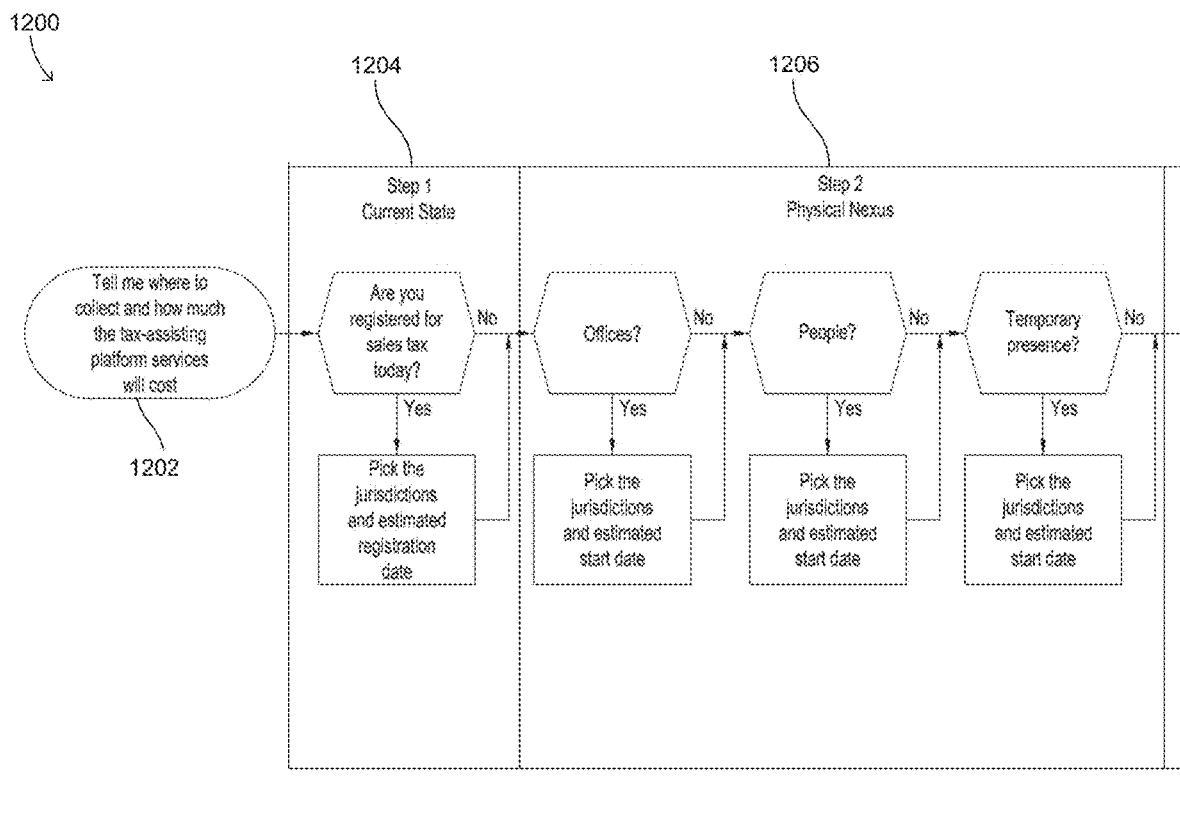
FIGS. 12A-12D, taken in sequence, depict a flow diagram of an example process of a tax nexus online interactive notification platform, according to various embodiments of the present disclosure.
Figure 13B:
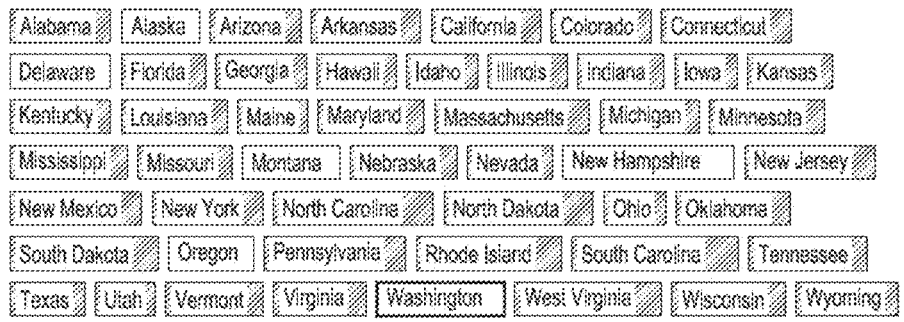
FIG. 13B is an example portion of a user interface of a tax nexus online interactive notification platform prompting a querying entity with a query regarding where the querying entity is currently registered to collect sales tax from its customers, according to various embodiments of the present disclosure.
Figure 13B:
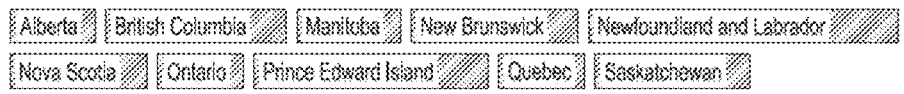

FIG. 13B is an example portion of a user interface 1312 of a tax nexus online interactive notification platform prompting a querying entity with a query 1314 regarding where the querying entity is currently registered to collect sales tax from its customers, according to various embodiments of the present disclosure. As an example, shown is a selectable list 1316 of various possible tax jurisdictions of the United States and Canada. Although not shown, additional embodiments are possible, for example a feature (button), maybe between 1314 and 1316 to allow the user to "select all" of the options in 1316. Also shown is selectable user interface element 1318 which the user may select to indicate that the querying entity collects taxes outside the United States and Canada. In some embodiments, the user interface 1312 prompting a querying entity with a query 1314 regarding where the querying entity is currently registered to collect sales tax from its customers may be a query presented in step 1 "Current State" 1204 of FIG. 12A to determine tax jurisdictions in which the querying entity is already registered.

Figure 13C:
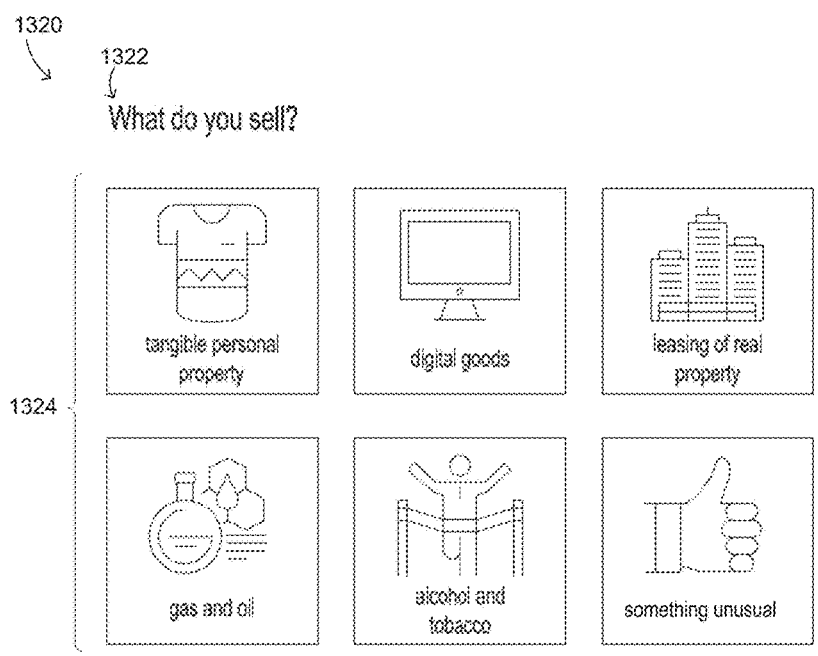
FIG. 13C is an example portion of a user interface of a tax nexus online interactive notification platform prompting a querying entity with a query regarding what types of products the querying entity sells, according to various embodiments of the present disclosure.

FIG. 13C is an example portion of a user interface 1320 of a tax nexus online interactive notification platform prompting a querying entity with a query 1322 regarding what types of products the querying entity sells, according to various embodiments of the present disclosure. As an example, shown is a selectable list 1324 of various types or categories of products or services the querying entity may sell (e.g., "tangible personal property", "digital goods", "leasing of real property", "gas and oil", "alcohol and tobacco" and "something unusual"). Queries regarding other types or categories of goods and services may be used in various other embodiments. In some embodiments, as tax rules for various tax jurisdictions may differ based on various types or categories of products or services the querying entity may sell, the potential tax liability determination and/or the next query or set of queries presented may be determined or based on the entry made in response to the query 1322 regarding what types of products the querying entity sells.

Figure 12B:
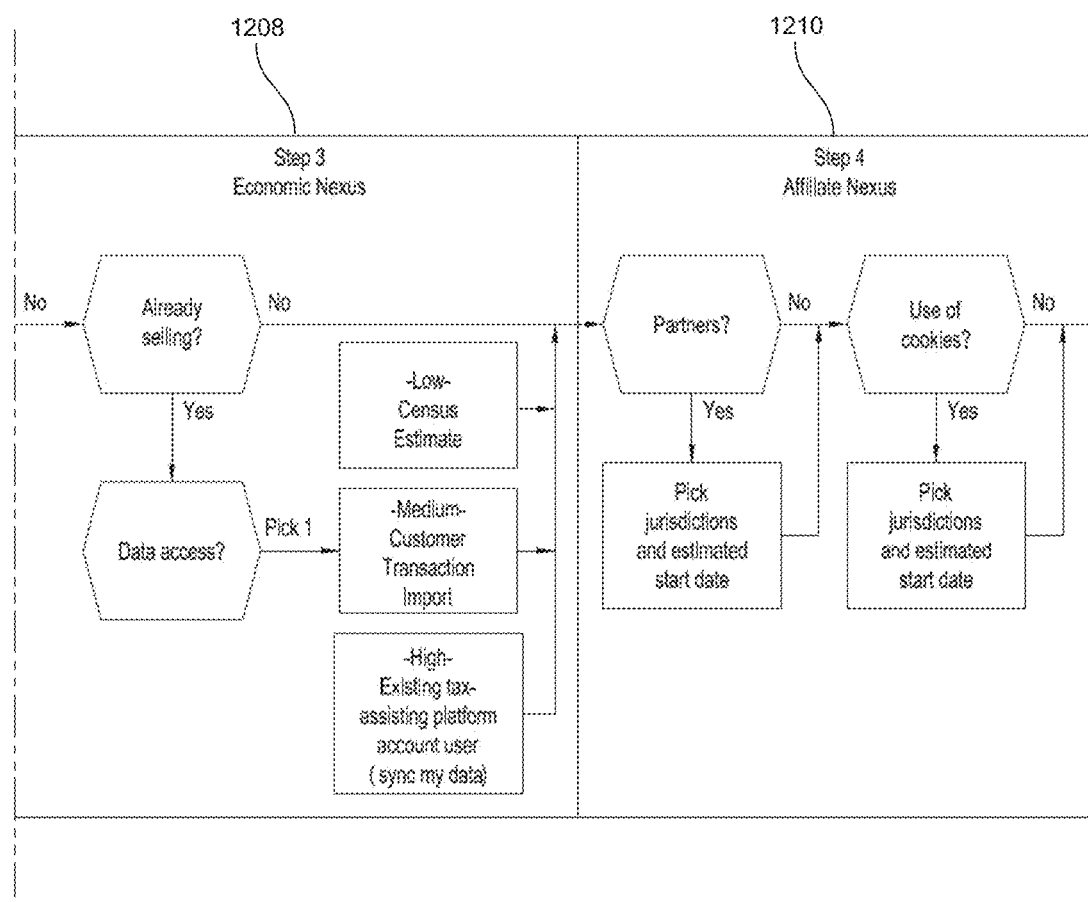
Figure 13D:
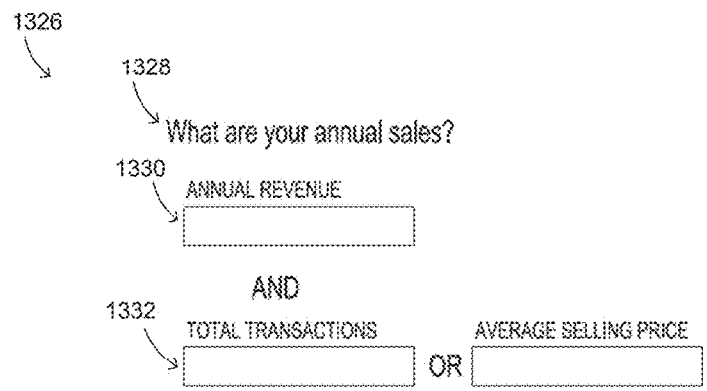
FIG. 13D is an example portion of a user interface of a tax nexus online interactive notification platform prompting a querying entity with a query regarding sales of the querying entity, according to various embodiments of the present disclosure.

FIG. 13D is an example portion of a user interface 1326 of a tax nexus online interactive notification platform prompting a querying entity with a query 1328 regarding sales of the querying entity, according to various embodiments of the present disclosure. As part of the query 1328 regarding sales of the querying entity, for example, an "ANNUAL REVENUE" entry field 1330 is presented for the user to enter the annual revenue for the business of the querying entity. Also a "TOTAL TRANSACTIONS" and "AVERAGE SELLING PRICE" entry field 1332 is presented for the user to enter the total transactions and average selling price for the business of the querying entity. In some embodiments, the user interface 1326 prompting the querying entity with the query 1328 regarding sales of the querying entity may be a query presented in step 3 "Economic Nexus" 1208 of FIG. 12B to determine sales of the business over a period of time (e.g., a monetary amount of sales and/or a volume of sales) to facilitate the determination of potential lack of transaction tax compliance of the querying entity in various tax jurisdictions based on rules in each tax jurisdiction about establishing economic nexus for purposes of remitting transaction tax in the tax jurisdiction.

Figure 13E:
FIG. 13E is an example portion of a user interface of a tax nexus online interactive notification platform presenting an example format for presenting a determined apportionment of sales of the querying entity in a plurality of tax jurisdictions, according to various embodiments of the present disclosure.

FIG. 13E is an example portion of a user interface 1334 of a tax nexus online interactive notification platform presenting an example format 1336 for presenting a determined apportionment of sales of the querying entity in a plurality of tax jurisdictions, according to various embodiments of the present disclosure. For example, for each tax jurisdiction of the plurality of tax jurisdictions that is not the one or more tax jurisdictions in which the querying entity had already registered (as deduced by the response to query 1314 of FIG. 13B), the system 100 may apportion to the tax jurisdiction one or more of: an apportioned number of transactions (indicated in FIG. 13E by "$x,xxx" shown next to each tax jurisdiction) and an apportioned monetary sales amount (indicated in FIG. 13E by "YYY sales" shown next to each tax jurisdiction), according to at least one criterion. The criterion, for example, may include criterion regarding relative populations among the plurality of tax jurisdictions, and/or criterion regarding economic statistics about the plurality of tax jurisdictions. For example, jurisdictions with larger populations and/or larger economies indicated by economic statistics may receive a proportionally larger apportioned number of transactions and/or a proportionally larger apportioned monetary sales amount. In various embodiments, such data may be obtained from the record of apportionment 410 of FIG. 4 and/or the geographic area records of FIG. 5 (e.g., geographic area 1 record 525 and geographic area 2 record 527) generated as a result of those respective processes illustrated in FIG. 4 and/or FIG. 5.

Also shown is a selectable user interface element 1338 which the user may select to receive further information about jurisdictions which do not have transaction taxes.

Figure 12C:
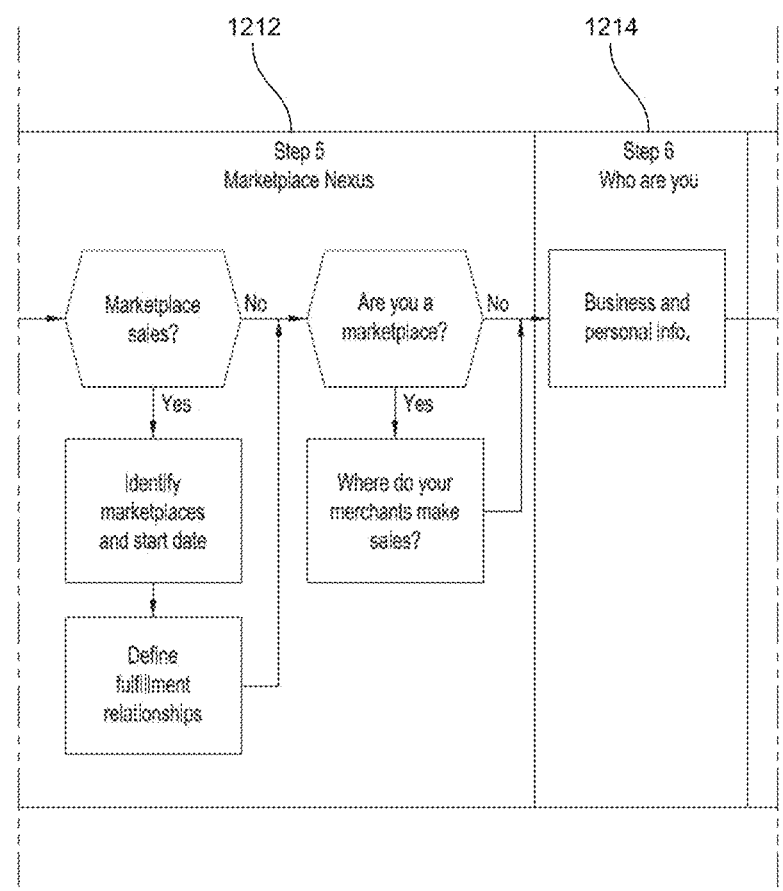
Figure 13F:
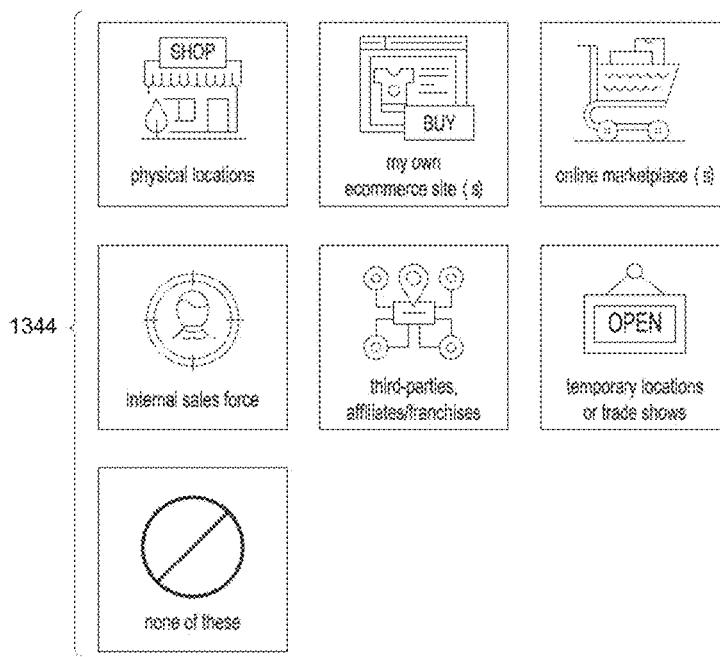
FIG. 13F is an example portion of a user interface of a tax nexus online interactive notification platform prompting a querying entity with a query regarding how the querying entity conducts sales, according to various embodiments of the present disclosure.

FIG. 13F is an example portion of a user interface 1340 of a tax nexus online interactive notification platform prompting the querying entity with a query 1342 regarding how the querying entity conducts sales, according to various embodiments of the present disclosure. Shown is a plurality selectable user interface elements 1344 from which the user may select to indicate how the business of the querying entity conducts sales. For example, by selecting corresponding user interface elements, the user may indicate that the business of the querying entity conducts sales via one or more of: "physical locations", "e-commerce site(s)", "online marketplace(s)", "internal sales force", "third-parties, affiliates/franchises", and "temporary locations or trade shows". The user may indicate that the business of the querying entity does not conducts sales via any of those options by selecting the "none of these" user interface element. In some embodiments, the portion of the user interface 1340 prompting the querying entity with a query 1342 regarding how the querying entity conducts sales may be a query presented in step 2 "Physical Nexus" 1206 of FIG. 12A, step 4 "Affiliate Nexus" 1210 of FIG. 12B and/or step 5 "Marketplace Nexus" 1212 of FIG. 12C to facilitate the determination of potential lack of transaction tax compliance of the querying entity in various tax jurisdictions based on rules in each tax jurisdiction about establishing nexus for purposes of remitting transaction tax in the respective tax jurisdiction.

Figure 13G:
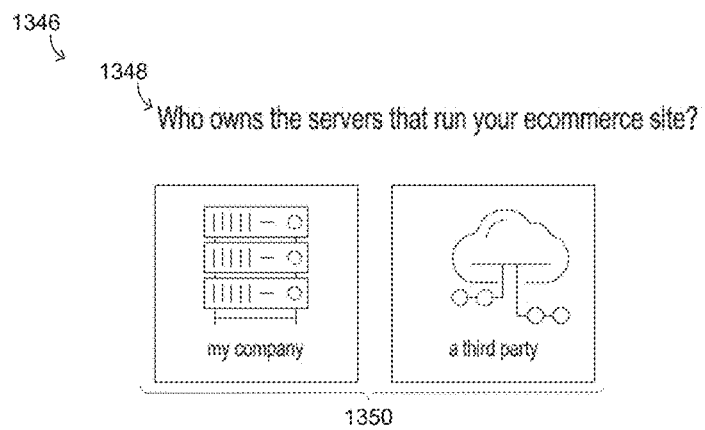
FIG. 13G is an example portion of a user interface of a tax nexus online interactive notification platform prompting a querying entity with a query regarding who owns the servers that run an e-commerce site of the querying entity, according to various embodiments of the present disclosure.

FIG. 13G is an example portion of a user interface 1346 of a tax nexus online interactive notification platform prompting the querying entity with a query 1348 regarding who owns the servers that run an e-commerce site of the querying entity, according to various embodiments of the present disclosure. In particular, the query 1348 regarding who owns the servers that run an e-commerce site of the querying entity may be presented in response to the user having previously selected the "e-commerce site(s)" selectable user interface element of the previous query 1342 of FIG. 13E regarding how the querying entity conducts sales.

Shown are a plurality of selectable user interface elements 1350 from which the user may select to indicate who owns the servers that run an e-commerce site of the querying entity (e.g., "my company" and/or "a third party"). If the user had not selected the "e-commerce site(s)" selectable user interface element of the previous query 1342, then the query 1348 of FIG. 13G regarding who owns the servers that run an e-commerce site is avoided, thus increasing the speed and efficiency of the technology of automated determination of potential lack of tax compliance of the querying entity for various tax jurisdictions by eliminating superfluous queries, system data accesses, comparisons and calculations. In some embodiments, the portion of the user interface 1346 prompting the querying entity with a query 1348 regarding who owns the servers that run an e-commerce site of the querying entity may be a query presented in step 4 "Affiliate Nexus" 1210 of FIG. 12B to facilitate the determination of potential lack of transaction tax compliance of the querying entity in various tax jurisdictions based on rules in each tax jurisdiction about establishing nexus for purposes of remitting transaction tax in the respective tax jurisdiction.

FIG. 13H is an example portion of a user interface 1352 of a tax nexus online interactive notification platform prompting the querying entity with a query 1354 regarding where the querying entity has website servers that it owns, according to various embodiments of the present disclosure. As an example, shown is a selectable list 1356 of various possible tax jurisdictions of the United States from which the user may select to indicate where the querying entity has website servers that it owns. In particular, the query 1354 regarding where the querying entity has website servers that it owns may be presented in response to the user having previously selected the "e-commerce site(s)" selectable user interface element of the previous query 1342 of FIG. 13E regarding how the querying entity conducts sales. If the user had not selected the "e-commerce site(s)" selectable user interface element of the previous query 1342, then presentation of the query 1354 of FIG. 13H regarding where the querying entity has website servers is avoided, thus increasing the speed and efficiency of the technology of automated determination of potential lack of tax compliance of the querying entity for various tax jurisdictions by eliminating superfluous queries, system data accesses, comparisons and calculations. In some embodiments, the portion of the user interface 1352 prompting the querying entity with a query 1354 regarding where the querying entity has website servers that it owns may be a query presented in step 2 "Physical Nexus" 1206 of FIG. 12A to facilitate the determination of potential lack of transaction tax compliance of the querying entity in various tax jurisdictions based on rules in each tax jurisdiction about establishing nexus for purposes of remitting transaction tax in the respective tax jurisdiction.

Figure 13I:
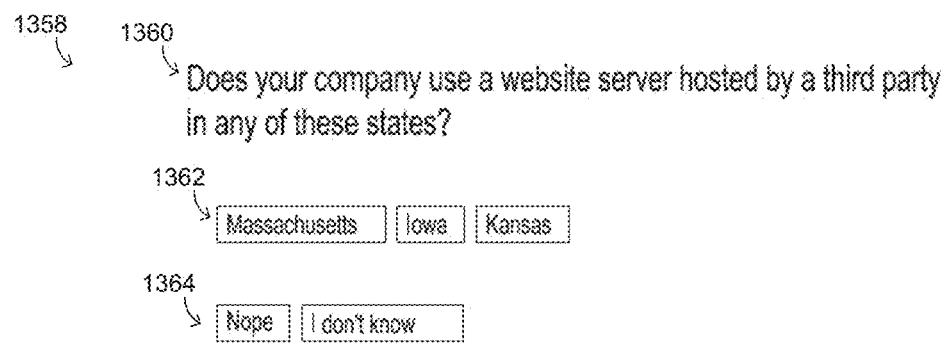
FIG. 13I is an example portion of a user interface of a tax nexus online interactive notification platform prompting a querying entity with a query regarding whether the querying entity uses a website server hosted by a third party in particular tax jurisdictions, according to various embodiments of the present disclosure.

FIG. 13I is an example portion of a user interface 1358 of a tax nexus online interactive notification platform prompting a querying entity with a query 1360 regarding whether the querying entity uses a website server hosted by a third party in particular tax jurisdictions, according to various embodiments of the present disclosure. As an example, shown is a selectable list 1362 of particular tax jurisdictions for which it is relevant to know whether the querying entity uses a website server hosted by a third party in those jurisdictions for purposes of the system 100 determining potential lack of transaction tax compliance of the querying entity for those specific tax jurisdictions based on rules in those specific tax jurisdiction about establishing nexus for remitting transaction tax. Also shown is a selectable user interface element 1364 from which the user may select to indicate that the querying entity does not use a website server hosted by a third party in any of the particular tax jurisdictions in the selectable list 1362 or that the user does not know whether the querying entity uses a website server hosted by a third party in those particular tax jurisdictions. If the user indicates, via the selectable list 1362, that the querying entity does not use a website server hosted by a third party in any of the particular tax jurisdictions, then additional queries and/or calculations regarding having such servers located in those jurisdictions are avoided when determining potential lack of transaction tax compliance of the querying entity for those specific tax jurisdictions, thus increasing the speed and efficiency of the technology of automated determination of potential lack of tax compliance of the querying entity.

In some embodiments, the portion of the user interface 1358 prompting a querying entity with a query 1360 regarding whether the querying entity uses a website server hosted by a third party in particular tax jurisdictions may be a query presented in step 2 "Physical Nexus" 1206 of FIG. 12A, step 4 "Affiliate Nexus" 1210 of FIG. 12B and/or step 5 "Marketplace Nexus" 1212 of FIG. 12C to facilitate the determination of potential lack of transaction tax compliance of the querying entity in various tax jurisdictions based on rules in each tax jurisdiction about establishing nexus for purposes of remitting transaction tax in the respective tax jurisdiction.

Figure 13J:
FIG. 13J is an example portion of a user interface of a tax nexus online interactive notification platform prompting a querying entity with a query regarding activities of employees of the querying entity, according to various embodiments of the present disclosure.

FIG. 13J is an example portion of a user interface 1366 of a tax nexus online interactive notification platform prompting the querying entity with a query 1368 regarding activities of employees of the querying entity, according to various embodiments of the present disclosure. As an example, shown is a selectable list 1370 of example possible activities of employees of the querying entity that may be relevant for determination of potential lack of transaction tax compliance of the querying entity in various tax jurisdictions. In some embodiments, the portion of the user interface 1366 prompting a querying entity with a query 1368 regarding activities of employees of the querying entity may be a query presented in step 2 "Physical Nexus" 1206 of FIG. 12A.

Also, shown is a selectable menu 1372 with selectable user interface elements corresponding to different portions of the user interface such as those shown in FIGS. 13A-13M that include different categories of queries (e.g., "What you sell", "How you sell", "Employees", "Third Parties", "Warehousing", and "Distribution"). When a corresponding selectable user interface element of the selectable menu 1372 is selected, the system 100 navigates the user to the corresponding portion of the user interface that includes that category of queries. Also shown in the selectable menu 1372 is a "Potential Nexus" selectable user interface element that, when selected, navigates the user to a portion of the user interface that provides further information regarding jurisdictions in which there is a potential lack of tax compliance of the querying entity.

Figure 13K:
FIG. 13K is an example portion of a user interface of a tax nexus online interactive notification platform prompting a querying entity with a query regarding activities of third parties affiliated with the querying entity, according to various embodiments of the present disclosure.

FIG. 13K is an example portion of a user interface 1373 of a tax nexus online interactive notification platform prompting a querying entity with a query 1374 regarding activities of third parties affiliated with the querying entity, according to various embodiments of the present disclosure. As an example, shown is a selectable list 1375 of example possible activities of third parties affiliated with the querying entity that may be relevant for determination of potential lack of transaction tax compliance of the querying entity in various tax jurisdictions. In some embodiments, the portion of the user interface 1373 prompting a querying entity with a query 1374 regarding activities of third parties affiliated with the querying entity may be a query presented in step 4 "Affiliate Nexus" 1210 of FIG. 12B.

Figure 13L:
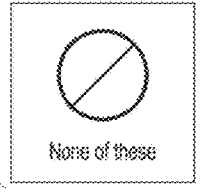
FIG. 13L is an example portion of a user interface of a tax nexus online interactive notification platform prompting a querying entity with a query regarding where inventory of the querying entity is located or stored, according to various embodiments of the present disclosure.

FIG. 13L is an example portion of a user interface 1376 of a tax nexus online interactive notification platform prompting a querying entity with a query 1377 regarding where inventory of the querying entity is located or stored, according to various embodiments of the present disclosure. As an example, shown is a selectable list 1378 of example choices regarding where inventory of the querying entity is located or stored that may be relevant for determination of potential lack of transaction tax compliance of the querying entity in various tax jurisdictions. In some embodiments, the portion of the user interface 1376 prompting a querying entity with a query 1377 regarding where inventory of the querying entity is located or stored may be a query presented in step 2 "Physical Nexus" 1206 of FIG. 12A, step 4 "Affiliate Nexus" 1210 of FIG. 12B and/or step 5 "Marketplace Nexus" 1212 of FIG. 12C to facilitate the determination of potential lack of transaction tax compliance of the querying entity in various tax jurisdictions based on rules in each tax jurisdiction about establishing nexus for purposes of remitting transaction tax in the respective tax jurisdiction.

Figure 13M:
FIG. 13M is an example portion of a user interface of a tax nexus online interactive notification platform prompting a querying entity with a query regarding how the querying entity transports its products, according to various embodiments of the present disclosure.
Figure 13N:
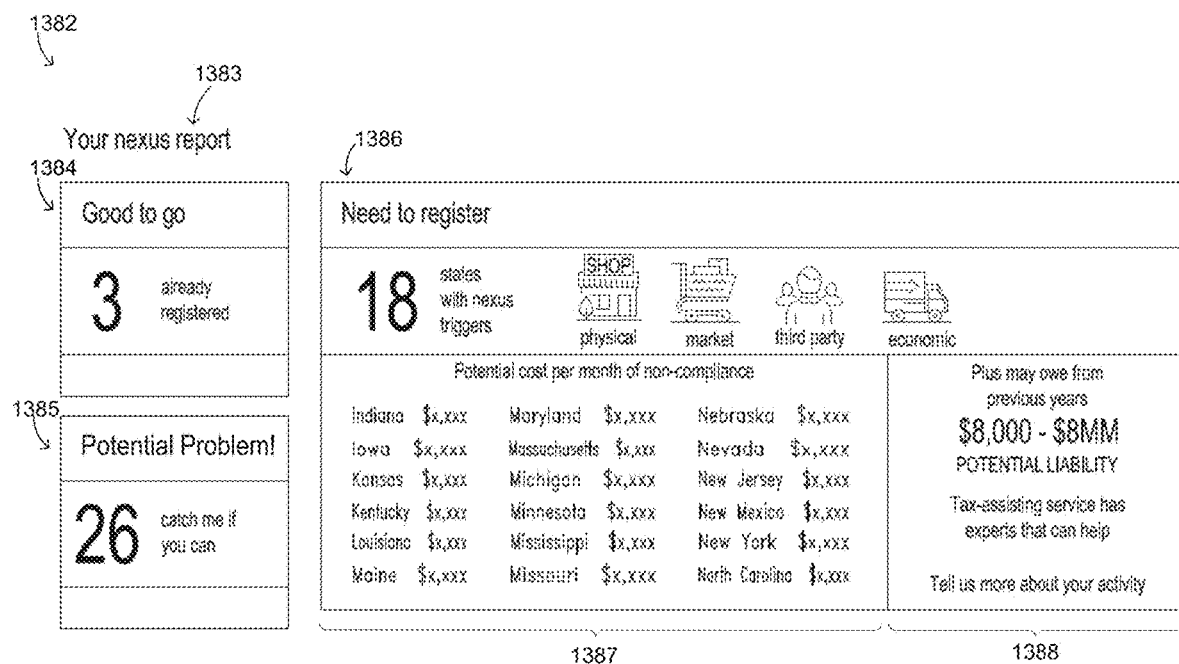
FIG. 13N is an example portion of a user interface of a tax nexus online interactive notification platform presenting a report regarding potential tax liability of the querying entity based on responses from the querying entity to prompts presenting queries for the querying entity, according to various embodiments of the present disclosure.
Figure 13O:
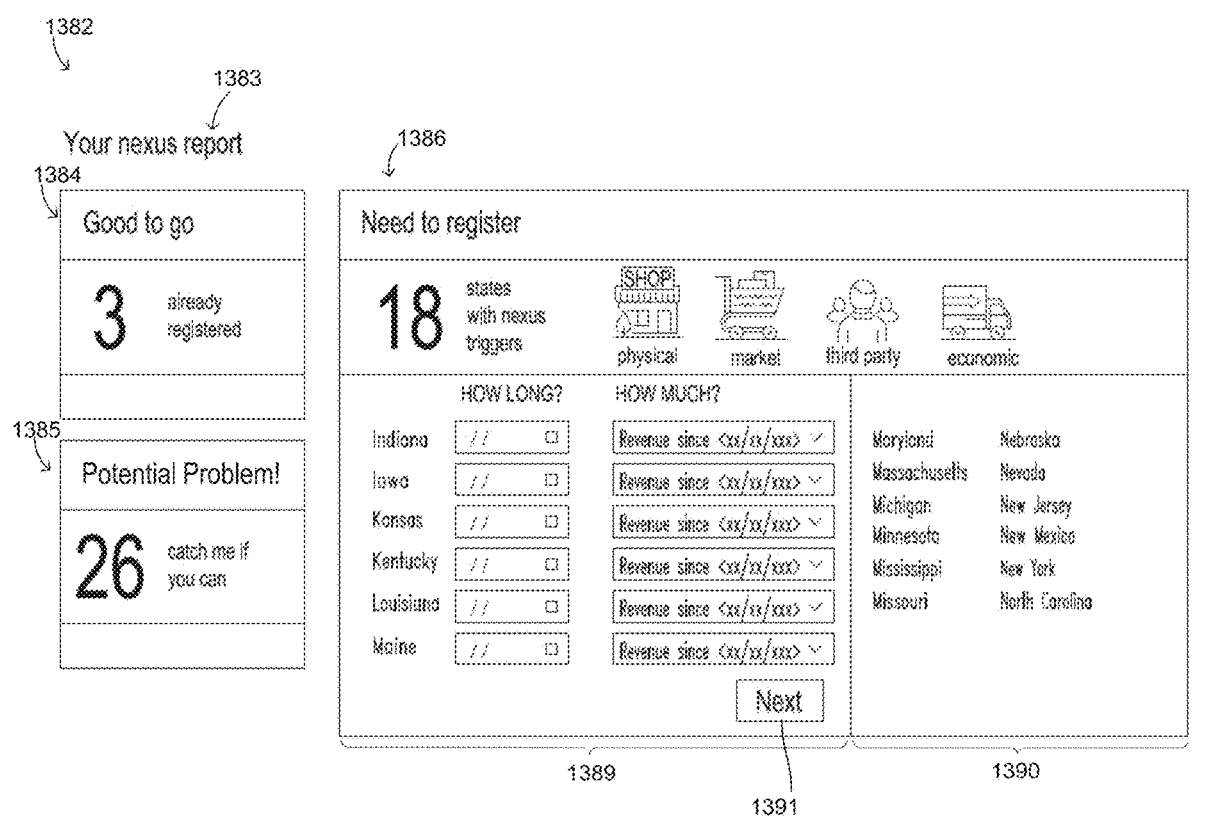
Figure 13P:
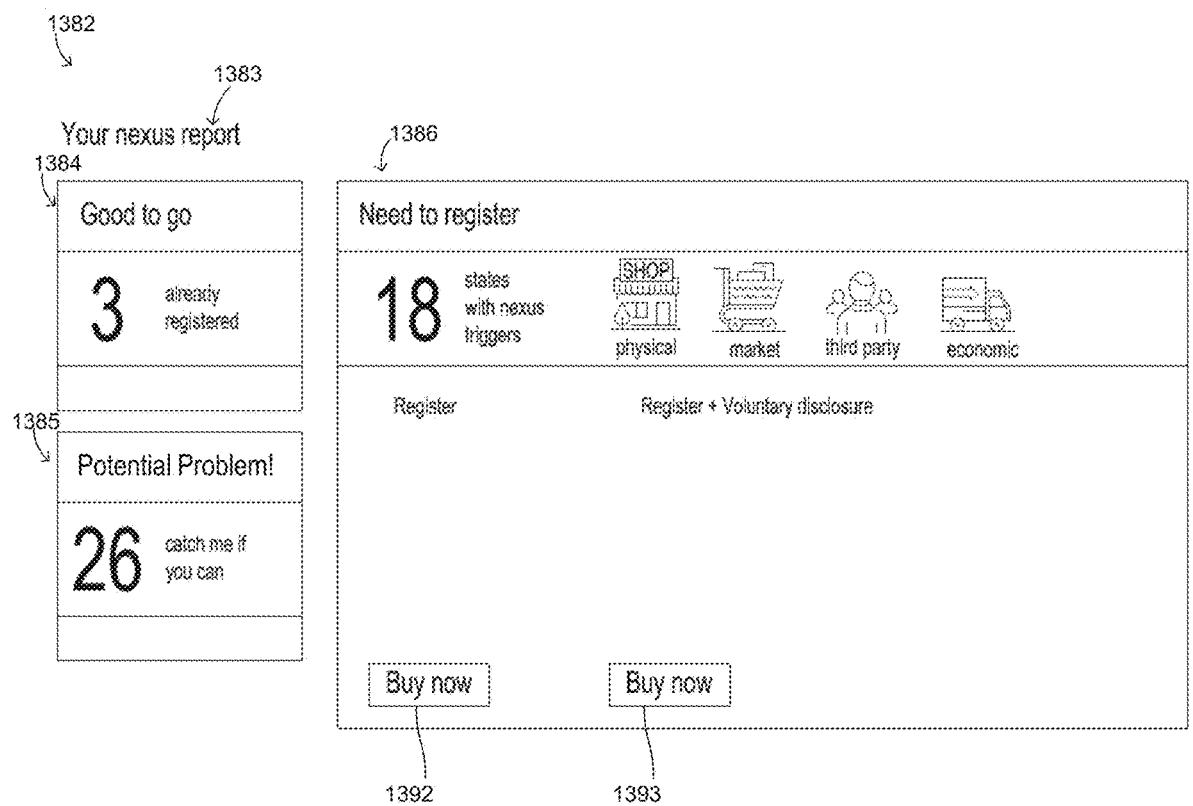
FIG. 13P is an example portion of a user interface of a tax nexus online interactive notification platform presenting an interactive user interface element that, once selected, may automatically initiate a process of registering the querying entity in one or more tax jurisdictions for purposes of remitting transaction taxes in the tax jurisdictions, according to various embodiments of the present disclosure.

FIG. 13M is an example portion of a user interface 1379 of a tax nexus online interactive notification platform prompting a querying entity with a query 1380 regarding how the querying entity transports its products, according to various embodiments of the present disclosure. As an example, shown is a selectable list 1381 of examples of how the querying entity may transport its products that may be relevant for determination of potential lack of transaction tax compliance of the querying entity in various tax jurisdictions. In some embodiments, the portion of the user interface 1379 prompting a querying entity with a query 1380 regarding how the querying entity transports its products may be a query presented in step 2 "Physical Nexus" 1206 of FIG. 12A, step 4 "Affiliate Nexus" 1210 of FIG. 12B and/or step 5 "Marketplace Nexus" 1212 of FIG. 12C to facilitate the determination of potential lack of transaction tax compliance of the querying entity in various tax jurisdictions based on rules in each tax jurisdiction about establishing nexus for purposes of remitting transaction tax in the respective tax jurisdiction.

FIG. 13N is an example portion of a user interface 1382 of a tax nexus online interactive notification platform presenting a report 1383 regarding potential tax liability of the querying entity based on responses from the querying entity to prompts presenting queries for the querying entity, according to various embodiments of the present disclosure. Shown is a report portion 1384 indicating to the user tax jurisdictions in which the querying entity is already registered and a report portion 1385 indicating to the user tax jurisdictions in which the querying entity may have some economic or physical connections, but for which the system 100 has determined there is no potential lack of tax compliance of the querying entity based on the responses to the previous queries and the particular tax rules for those jurisdictions. Also shown is a report portion 1386 which indicates notifications to the user of tax jurisdictions for which the system 100 has determined there is a potential lack of tax compliance of the querying entity based on the responses to the previous queries and the particular tax rules for those jurisdictions. For example, this may include the total number of tax jurisdictions for which the system 100 has determined there is a potential lack of tax compliance of the querying entity. Also shown is a report portion 1387 which presents a list of the tax jurisdictions for which the system 100 has determined there is a potential lack of tax compliance of the querying entity and the format for presenting the potential cost per month to the querying entity of non-compliance in each of those tax jurisdictions. Also shown is a report portion 1388 which presents the potential liability in taxes that may be owed by the querying entity from previous years for the tax jurisdictions for which the system 100 has determined there is a potential lack of tax compliance.

FIG. 13O is an example portion of the user interface 1382 of a tax nexus online interactive notification platform presenting a further report section 1389 and further report section 1390 regarding potential tax liability of the querying entity for potential tax liability for previous years based on responses from the querying entity to prompts presenting queries for the querying entity, according to various embodiments of the present disclosure. Further report section 1389 presents interactive user interface elements in which the user may indicate, for each tax jurisdiction in a first group of tax jurisdictions for which the system 100 has determined there is a potential lack of tax compliance, prior lengths of time the querying entity had presence in the respective tax jurisdiction and a date on which the querying entity started receiving revenue from sales in that particular tax jurisdiction. Further report section 1390 presents interactive user interface elements in which the user may indicate, for each tax jurisdiction in a second group of tax jurisdictions for which the system 100 has determined there is a potential lack of tax compliance, prior lengths of time the querying entity had presence in the respective tax jurisdiction and a date on which the querying entity started receiving revenue from sales in that particular tax jurisdiction. The user may proceed from further report section 1389 to further report section 1390 by selecting a graphical user interface element, such as the "Next" button 1391 shown in FIG. 13O.

FIG. 13P is an example portion of the user interface 1382 of a tax nexus online interactive notification platform presenting interactive user interface element 1392 and interactive user interface element 1393 that, once selected, automatically initiates a process of registering the querying entity in one or more tax jurisdictions for purposes of remitting transaction taxes in the tax jurisdictions, according to various embodiments of the present disclosure. In one embodiment, user interface element 1392 and user interface element 1393 may be presented on a display of the client computing device of the querying entity that, once either is selected, automatically initiates a process of registering the querying entity in one or more tax jurisdictions for purposes of remitting transaction taxes in the tax jurisdiction. This may be in response to, or otherwise based on, the determination by the system 100 that there is a potential lack of tax compliance of the querying entity for those tax jurisdictions. For example, the user may select user interface element 1392 labeled "Buy now" to automatically initiate a process of registering the querying entity in one or more of the tax jurisdictions (shown in report portion 1387 of FIG. 13N) for which the system 100 has determined there is a potential lack of tax compliance of the querying entity based on the responses to the previous queries and the particular tax rules for those jurisdictions. Selecting the user interface element 1392 labeled "Buy now" may also charge the querying entity a fee or subscription rate for such a service via the tax-assisting service platform 340 of FIG. 3.

In some embodiments, the user may select specific tax jurisdictions from report portion 1387 of FIG. 13N for which the system 100 has determined there is a potential lack of tax compliance to have the system 100 automatically initiate a process of registering the querying entity in those selected tax jurisdictions. Also, by selecting the user interface element 1393, the system may initiate a voluntary disclosure for the querying entity in addition to automatically initiating a process of registering the querying entity in one or more tax jurisdictions for which the system 100 has determined there is a potential lack of tax compliance.

Figure 12D:
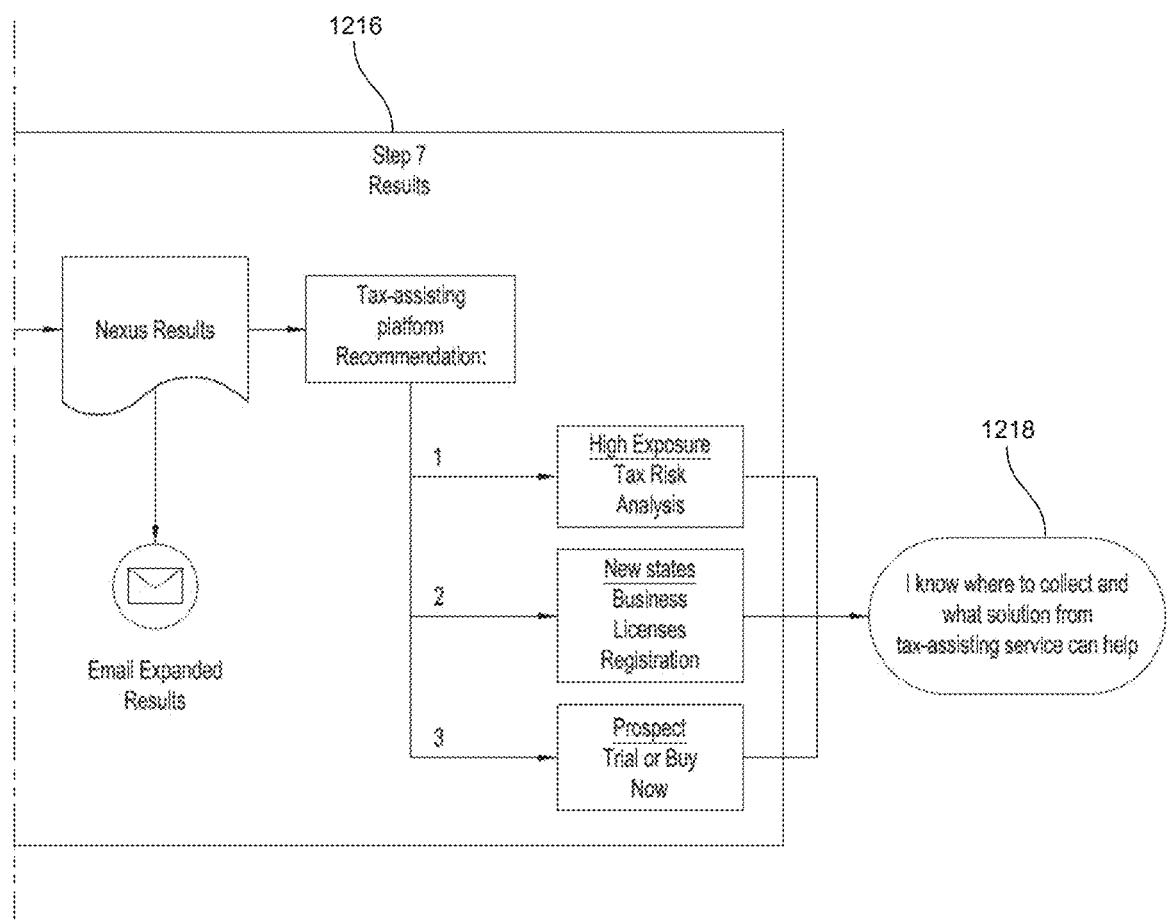

In some embodiments, the portion of the user interface 1382 shown in FIGS. 13N-13P, or variations thereof, may be presented in step 7 "Results" 1216 of FIG. 12D as part of the tax compliance determination results provided in step 7 "Results" 1216.

In some embodiments, the system 100 may also generate the information about goods or services sold by the plurality of entities. The system may perform this by, for each entity of the plurality of entities, performing per-transaction transaction tax calculations for the entity to facilitate the entity to execute sales transactions associated with one or more of the plurality of tax jurisdictions for the goods or services. The determining whether there exists a potential lack of transaction tax compliance may include comparing the information about goods or services sold by the plurality of entities against stored rules for the plurality of tax jurisdictions. Such stored rules may be about establishing nexus for purposes of remitting transaction tax in a certain tax jurisdiction.

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example, these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include—starting from the bottom—an operating system (OS) 250, libraries 260, frameworks/middleware 270 and application programs 280. Other software architectures may include less, more or different layers. For example, a presentation layer may also be included. For another example, some mobile or special purpose operating systems may not provide a frameworks/middleware 270.

OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPREG4, H.264, MP3, AAC, AMR, JPG, and PNG. API libraries 262 may also include graphics libraries, for instance an OpenGL framework that may be used to render 2D and 3D in a graphic content on screen 221. API libraries 262 may further include database libraries, for instance SQLite, which may support various relational database functions. API libraries 262 may additionally include web libraries, for instance WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 281. Browser 281 is an example of a renderer, which includes program modules and instructions that enable computer 112, to exchange network messages with network 194 using hypertext transfer protocol (HTTP) messaging.

Other such applications 280 may include a contacts application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors, such as processor 214. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 214, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The claimed invention is:

1. A system, comprising:
   at least one processor; and
   a memory coupled to the at least one processor, the memory storing instructions that, when executed by the at least one processor, cause the system to perform operations comprising:
   an application programming interface (API) of a specialized service engine of a server computer of a specialized software platform electronically receiving, from a client computing device over a network, a request regarding transaction data of a querying entity, wherein the client computing device includes a user input device;
   the API of the specialized service engine of the server computer electronically transmitting a request to an electronic enterprise resource planning (ERP) system of the of the querying entity for transaction data of the querying entity;
   in response to the API of the specialized service engine of the server computer of the specialized software platform electronically receiving the request, the API of the specialized service engine of the server computer automatically invoking a query generation engine of the specialized service engine of the server computer to generate a set of electronic queries about transaction data of the querying entity;
   in response to the automatically invoking the query generation engine of the specialized service engine of the server computer, the query generation engine of the specialized service engine of the server computer generating a set of electronic queries about the transaction data;
   in response to the set of electronic queries about the transaction data being generated by the query generation engine of the specialized service engine of the server computer, the API of the specialized service engine of the server computer electronically transmitting a response including the generated set of electronic queries from the query generation engine to the electronic ERP system of the of the querying entity;
   in response to electronically transmitting the response including the generated set of electronic queries from the query generation engine to the electronic ERP system of the of the querying entity, the API of the specialized service engine of the server computer electronically receiving from the electronic ERP system electronic entries for respective ones of the electronic queries that were electronically transmitted and received via the user input device from the client computing device to the ERP;

in respond to electronically receiving from the electronic ERP system the electronic entries for respective ones of the electronic queries, the API of the specialized service engine of the server computer electronically communicating within the server computer the electronic entries to an information generation engine of the specialized service engine of the server computer;

in response to the API of the specialized service engine of the server computer electronically communicating, within the server computer, the electronic entries to the information generation engine of the specialized service engine of the server computer, the information generation engine of the specialized service engine of the server computer electronically accessing a database of stored rules for a certain one of a plurality of geographic areas based on the electronic entries communicated within the server computer to the information generation engine of the specialized service engine of the server computer, the stored rules being about establishing nexus in the certain geographic area, wherein the nexus is based on one or more thresholds being met, within a predetermined threshold of being met, or exceeded, and wherein the on one or more thresholds are regarding transaction data of the querying entity;

the information generation engine of the specialized service engine of the server computer electronically comparing the received electronic entries against the stored rules for the certain one of the plurality of geographic areas;

the information generation engine of the specialized service engine of the server computer electronically determining information regarding potential nexus of the querying entity for the certain geographic area based on the comparison, in which the determining the information regarding potential nexus includes determining that there exists a potential nexus of the querying entity for the certain geographic area based on the comparison;

the specialized service engine of the server computer electronically communicating via the API of the specialized service engine of the server computer, to the client computing device over the network, the information regarding the potential nexus; and based on determining the information regarding potential nexus of the querying entity, causing, by the computer system, an interactive user interface element to be presented on a display of the client computing device that, once selected, automatically initiates a process of registering the querying entity in the geographic area for purposes of remitting resources in the certain geographic area.

2. The system of claim 1 in which the set of queries includes one or more queries regarding goods or services sold by the querying entity over an indicated time period.

3. The system of claim 1 in which the plurality of tax geographic areas are those of the United States of America.

4. The system of claim 1 in which the set of queries includes a query regarding prior registration of the querying entity with an agency in one or more of the plurality of geographic areas for purposes of remitting resources and in which the entries include an indication of a particular geographic area for which the querying entity had already registered for purposes of remitting resources associated with the particular geographic area, and the operations further comprise:

selecting, by the computer system, the certain geographic area to be a geographic area other than the particular geographic area based on the indication of the particular geographic area for which the querying entity had already registered.

5. The system of claim 1, the operations further comprising:

comparing, by the computer system, the received entries against stored rules for each geographic area of the plurality of geographic area, the stored rules for each geographic area being about establishing nexus in each geographic area of the plurality of geographic areas;

determining, by the computer system, information regarding potential nexus of the querying entity for each tax jurisdiction based on the comparison of the received entries against the stored rules for each geographic area; and communicating, by the computer system to the client computing device over the network, the information regarding the potential nexus of the querying entity for each geographic area.

6. The system of claim 1, the operations further comprising:

determining, by the computer system, information regarding potential lack of tax compliance of the querying entity for the geographic area based on the comparison of the received electronic entries against the stored rules for the certain geographical area; and communicating, by the computer system to the client computing device over the network, the information regarding the potential lack of tax compliance of the querying entity for the certain geographic area.

7. The system of claim 6 in which the stored rules for the additional geographic area are rules about meeting or exceeding one or more thresholds regarding transaction data over a period of time and the received entries include information indicative of transaction data of the querying entity applicable to the period of time, and in which the comparing the received entries against the stored rules for the additional geographic area includes comparing the information indicative of transaction data sales amounts of the querying entity to the one or more thresholds regarding transaction data.

8. The method system of claim 7 in which the comparing the received entries against the stored rules for the additional geographic area includes comparing the information indicative of a number of transactions of the querying entity to one or more thresholds regarding a number of transactions over the period of time.

9. The system of claim 1 in which the received entries include information indicative of one or more of: a number of transactions and transaction amounts of the querying entity over a period of time for the plurality of geographic areas, and the operations further comprise:

receiving, by the computer system, information indicative of one or more geographic areas in which the querying entity had already registered for remitting resources; and for each geographic area of the plurality of geographic areas that is not the one or more geographic areas in which the querying entity had already registered:

apportioning, by the computer system, to the geographic area, one or more of: an apportioned number of transactions and an apportioned transaction amounts, according to at least one criterion;

determining, by the computer system, information regarding potential nexus of the querying entity for the geographic area based on the apportionment; and communicating, by the computer system, to the client computing device over the network, the information regarding potential nexus of the querying entity in the geographic area.

10. The system of claim 9 in which the criterion includes criterion regarding relative populations among the plurality of geographic areas.

11. The system of claim 9 in which the criterion includes criterion regarding economic statistics about the plurality geographic areas.

12. The system of claim 1, the operations further comprising:

receiving, by the computer system, information indicative of the selection of the interactive user interface element; and completing, by the computer system, the process of registering the querying entity in the certain geographic area for purposes of remitting resources associated with the certain geographic area based on the information indicative of the selection of the interactive user interface element.

13. The system of claim 12, the operations further comprising:

after completing the process of registering the querying entity, enabling, by the computer system, collection of resources for the querying entity for remitting to the certain geographic area.

14. The system of claim 13, the operations further comprising:

populating, by the computer system, a calendar or schedule for the certain geographic area based on the completed process of registering the querying entity.

15. The system of claim 1, the operations further comprising:

comparing, by the computer system, the received entries against stored rules for each geographic area of the plurality of geographic areas, the stored rules for each geographic area being about establishing in each geographic area of the plurality of tax geographic areas;

determining, by the computer system, information regarding potential nexus of the querying entity for each geographic area based on the comparison of the received entries against the stored rules for each geographic area;

determining, by the computer system, that there exists a potential nexus of the querying entity for additional tax geographic areas of the plurality of geographic areas based on the comparison of the received entries against the stored rules for each tax geographic area; and based on the determination that there is a potential nexus of the querying entity for additional tax geographic areas, causing, by the computer system, for each of the additional tax geographic area, an interactive user interface element to be presented on a display of the client computing device that, once selected, automatically initiates a process of registering the querying entity in the tax geographic areas for purposes of remitting sources in the tax jurisdiction.

* * * * *